(12) United States Patent
Racz et al.

(10) Patent No.: US 12,432,046 B2
(45) Date of Patent: Sep. 30, 2025

(54) METHODS AND SYSTEMS FOR PROCESSING INFORMATION STREAMS

(71) Applicant: GENETEC INC., Saint-Laurent (CA)

(72) Inventors: Pierre Racz, Saint-Laurent (CA); Julien Vary, Saint-Laurent (CA)

(73) Assignee: GENETEC INC., Saint-Laurent (CA)

( * ) Notice: Subject to any disclaimer, the term of this patent is extended or adjusted under 35 U.S.C. 154(b) by 316 days.

(21) Appl. No.: 17/779,662

(22) PCT Filed: Oct. 29, 2020

(86) PCT No.: PCT/CA2020/051457
§ 371 (c)(1),
(2) Date: May 25, 2022

(87) PCT Pub. No.: WO2021/212204
PCT Pub. Date: Oct. 28, 2021

(65) Prior Publication Data
US 2023/0019877 A1     Jan. 19, 2023

Related U.S. Application Data

(63) Continuation-in-part of application No. 16/880,832, filed on May 21, 2020, now Pat. No. 11,153,360.
(Continued)

(51) Int. Cl.
*H04L 9/08* (2006.01)
*H04N 7/18* (2006.01)

(52) U.S. Cl.
CPC ............. *H04L 9/0819* (2013.01); *H04N 7/18* (2013.01)

(58) Field of Classification Search
CPC ................................. H04L 9/0819; H04N 7/18
See application file for complete search history.

(56) References Cited

U.S. PATENT DOCUMENTS

| 6,650,640 B1 | 11/2003 | Muller et al. |
| 7,242,681 B1 | 7/2007 | Van Bokkelen et al. |

(Continued)

FOREIGN PATENT DOCUMENTS

| EP | 1148738 A1 | 10/2001 |
| EP | 3973677 A1 | 3/2022 |

(Continued)

OTHER PUBLICATIONS

ACSAC '16: Proceedings of the 32nd Annual Conference on Computer Security Applications, Martin et al., pp. 78-88 ("Martin"), 2016 (Year: 2016).*

(Continued)

*Primary Examiner* — Luu T Pham
*Assistant Examiner* — Paul J Skwierawski

(57) ABSTRACT

A network element and a method for execution by such network element. The method comprises processing a plurality of information streams transiting the network element to identify a particular data stream as a suspected bearer of encrypted media, the particular data stream established between a first node and a second node. The method also comprises establishing a first control stream with the first node and a second control stream with the second node, wherein the first control stream is established using credentials associated with the second node. The method further comprises obtaining a cryptographic key sent by the first node over the first control stream and destined for the second node, sending the cryptographic key to the second node over the second control stream, obtaining encrypted media sent by the second node and destined for the first node and decrypting the encrypted media based on the cryptographic key.

38 Claims, 18 Drawing Sheets

Related U.S. Application Data

(60) Provisional application No. 62/850,788, filed on May 21, 2019, provisional application No. 63/013,021, filed on Apr. 21, 2020, provisional application No. 63/027,217, filed on May 19, 2020.

(56) References Cited

U.S. PATENT DOCUMENTS

| | | | |
|---|---|---|---|
| 8,792,353 | B1 | 7/2014 | Janarthanan et al. |
| 10,298,387 | B1 | 5/2019 | Good |
| 10,320,557 | B2* | 6/2019 | Kärkkäinen ...... H04N 21/43856 |
| 11,100,197 | B1* | 8/2021 | Bernardi .................. H04L 9/14 |
| 11,153,360 | B2 | 10/2021 | Racz et al. |
| 11,348,075 | B1* | 5/2022 | Oakes, III ............ G06Q 20/325 |
| 11,374,997 | B2 | 6/2022 | Racz et al. |
| 11,627,057 | B2* | 4/2023 | Sethi .................. H04L 41/0654 709/224 |
| 12,028,396 | B2 | 7/2024 | Racz et al. |
| 2002/0101872 | A1 | 8/2002 | Boivie |
| 2003/0206596 | A1 | 11/2003 | Carver et al. |
| 2004/0199670 | A1 | 10/2004 | Garfinkel |
| 2006/0104268 | A1 | 5/2006 | Lee et al. |
| 2006/0259966 | A1 | 11/2006 | Ilnicki |
| 2007/0076855 | A1 | 4/2007 | Melampy et al. |
| 2008/0056302 | A1 | 3/2008 | Erdal et al. |
| 2008/0080619 | A1 | 4/2008 | Zhou et al. |
| 2009/0183260 | A1 | 7/2009 | Hernacki et al. |
| 2010/0262628 | A1 | 10/2010 | Singer |
| 2011/0276712 | A1 | 11/2011 | Narula et al. |
| 2012/0106741 | A1 | 5/2012 | Aumasson et al. |
| 2013/0173819 | A1 | 7/2013 | Lee et al. |
| 2013/0279572 | A1 | 10/2013 | Li et al. |
| 2014/0143385 | A1 | 5/2014 | Neff et al. |
| 2015/0281125 | A1 | 10/2015 | Koponen et al. |
| 2015/0319041 | A1 | 11/2015 | Diab et al. |
| 2016/0100196 | A1 | 4/2016 | Wu et al. |
| 2016/0164651 | A1* | 6/2016 | Reddappagari ....... H04L 5/0044 370/252 |
| 2016/0205422 | A1 | 7/2016 | Saptharishi |
| 2017/0054697 | A1* | 2/2017 | Zhang ................ H04N 21/2347 |
| 2017/0063690 | A1 | 3/2017 | Bosshart |
| 2018/0007398 | A1 | 1/2018 | Bleidt et al. |
| 2018/0069661 | A1 | 3/2018 | Koenig |
| 2018/0227229 | A1 | 8/2018 | Lopez |
| 2018/0241727 | A1 | 8/2018 | Verzun et al. |
| 2018/0295400 | A1 | 10/2018 | Thomas et al. |
| 2019/0036841 | A1 | 1/2019 | Nolan et al. |
| 2019/0089673 | A1 | 3/2019 | Berhorst |
| 2019/0109820 | A1 | 4/2019 | Clark et al. |
| 2019/0116111 | A1 | 4/2019 | Izard et al. |
| 2019/0166057 | A1 | 5/2019 | Gilson |
| 2019/0238795 | A1* | 8/2019 | Chen .................... H04N 7/1675 |
| 2020/0014691 | A1* | 1/2020 | Ortiz .................... H04L 9/0894 |
| 2020/0045080 | A1* | 2/2020 | Wisniewski ........ H04L 63/0281 |
| 2020/0374333 | A1 | 11/2020 | Racz et al. |
| 2021/0020006 | A1* | 1/2021 | Schieltz ................ H04W 12/08 |
| 2021/0258300 | A1* | 8/2021 | Eriksson ............... H04L 9/3228 |
| 2021/0266102 | A1* | 8/2021 | Ferrari ................ H04W 12/033 |
| 2022/0028236 | A1 | 1/2022 | Racz et al. |
| 2022/0294841 | A1 | 9/2022 | Racz et al. |
| 2024/0323245 | A1 | 9/2024 | Racz et al. |

FOREIGN PATENT DOCUMENTS

| | | |
|---|---|---|
| JP | 2007325171 A | 4/2011 |
| KR | 100480186 B1 | 7/2005 |
| WO | 2020/232549 | 11/2020 |
| WO | 2021/212204 | 10/2021 |

OTHER PUBLICATIONS

Non-Final Office Action issued by the USPTO in connection with U.S. Appl. No. 17/824,269 on Nov. 8, 2022, 19 pages.

Written Opinion issued in connection with PCT application No. PCT/CA2020/050682 dated Jul. 17, 2020—16 pages.

Written Opinion issued in connection with PCT application No. PCT/CA2020/051457 on Dec. 31, 2020—7 pages.

Notice of Allowance issued by the USPTO in connection with U.S. Appl. No. 16/880,832 on Jun. 16, 2021, 16 pages.

Notice of Allowance issued by the USPTO in connection with U.S. Appl. No. 17/489,121 on Mar. 7, 2022, 9 pages.

Wireshark—About Wireshark Tab, https://www.wireshark.org/, 1 page, [retrieved May 21, 2020].

Wireshark Forum—"how to replay the video from packets captured by wireshark", https://osqa-ask.wireshark.org/questions/43920/how-to-replay-the-video-from-packets-captured-by-wireshark, 1 page, [retrieved May 21, 2020].

Vasvox, "VoIP Recording", http://web.archive.org/web/2016*/http://www.vasvox.com/voip-recording/, 2 pages, [cached Jun. 24, 2016 retrieved May 21, 2020].

Yang, Y.-K. et al., "RTP Payload Format for H.264 Video" https://toolsietiorg/html/rfc6184#page-75, 101 pages, [retrieved May 21, 2020].

Final Action issued by the USPTO in connection with U.S. Appl. No. 17/824,269 on Apr. 13, 2023, 20 pages.

European Search Report issued by the European Patent Office in connection with European patent application No. EP20810654.2 on Jun. 14, 2023, 10 pages.

Examiner's Answer issued by the USPTO in connection with U.S. Appl. No. 17/824,269 on Jan. 8, 2024, 6 pages.

Notice of Allowance issued by the USPTO in connection with U.S. Appl. No. 17/824,269 on Feb. 21, 2024, 11 pages.

* cited by examiner

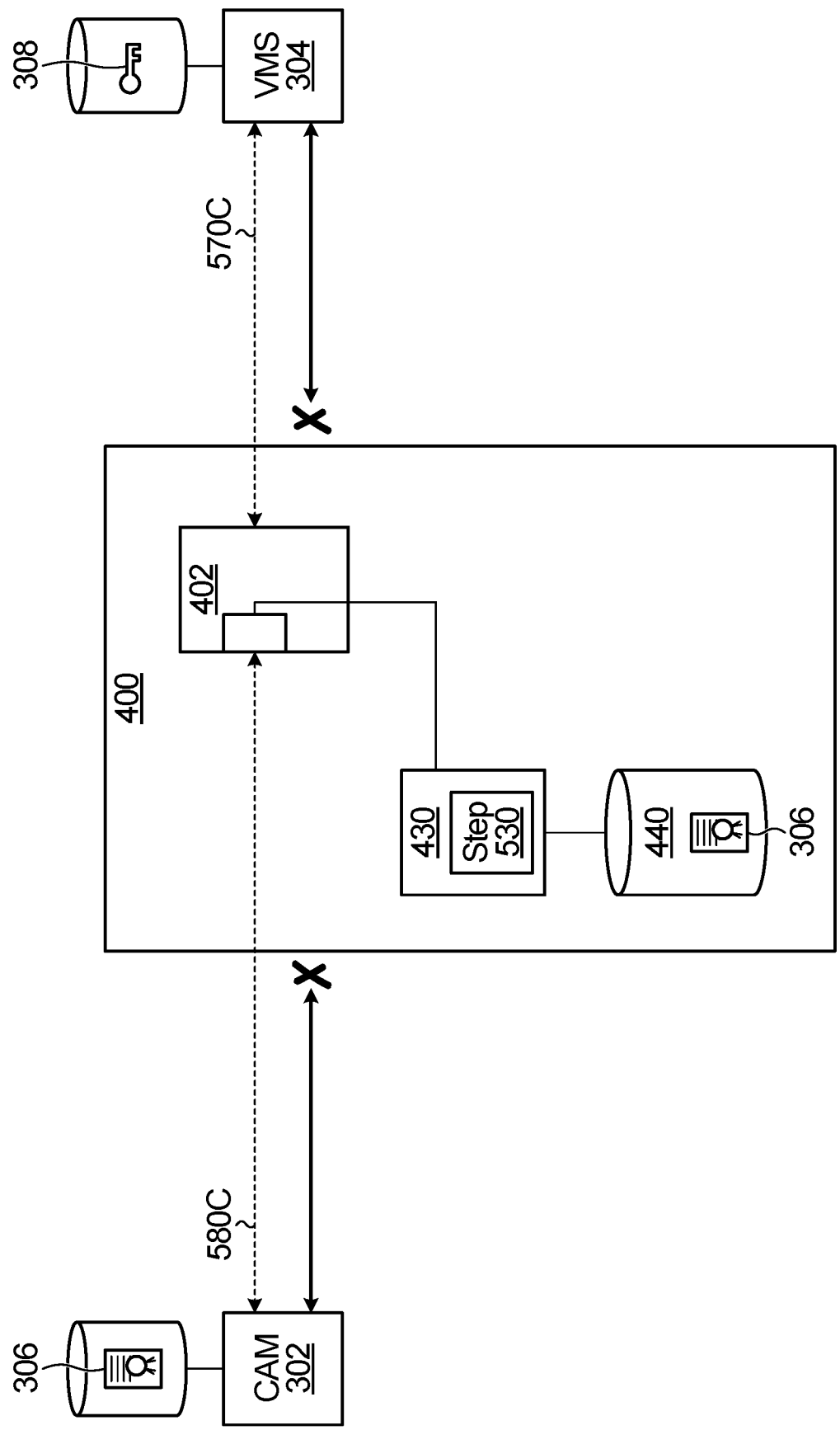

METHODS AND SYSTEMS FOR PROCESSING INFORMATION STREAMS

CROSS-REFERENCE TO RELATED APPLICATIONS

This application is a National Phase Entry of international PCT patent application No. PCT/CA2020/051457 filed on Oct. 29, 2020, which is a continuation-in-part of U.S. patent application Ser. No. 16/880,832, filed May 21, 2020, which claims the benefit of U.S. Provisional Patent Application Ser. No. 62/850,788 filed on May 21, 2019; U.S. Provisional Patent Application Ser. No. 63/013,021 filed on Apr. 21, 2020; and U.S. Provisional Patent Application Ser. No. 63/027,217, filed on May 19, 2020. The present application also claims the benefit of U.S. Provisional Patent Application Ser. No. 63/013,021 filed on Apr. 21, 2020; and U.S. Provisional Patent Application Ser. No. 63/027,217, filed on May 19, 2020. All of the aforementioned applications are hereby incorporated by reference herein.

FIELD

The present application is generally related to the processing of information streams in a communication network and, more specifically, to methods and systems for identifying those of the information streams that carry encrypted video data and for accessing the video data in unencrypted form.

BACKGROUND

A network node may receive and transmit Ethernet frames carrying IP traffic of various kinds between numerous combinations of pairs of nodes. Depending on the protocol used by a given pair of nodes, the IP packets exchanged between the nodes may be part of a connectionless information stream (e.g., in accordance with the User Datagram Protocol—UDP) or a connection-oriented information stream (e.g., in accordance with the Transmission Control Protocol—TCP). Moreover, depending on the type of information that the nodes wish to convey, the information stream may be considered a control stream (e.g., in accordance with the Real Time Streaming Protocol—RTSP) or a data stream (e.g., in accordance with the Real-time Transport Protocol—RTP). Moreover, in the case of a data stream, the IP packets may contain unencrypted video data, encrypted video data, or other data. Finally, in the case of video data, any of a variety of codecs may be used for encoding purposes.

As such, not only is the number of combinations of possible sources and destinations large, so is the variability in the types of information that may carried by each information stream and in the ways in which the information may be encoded.

In some circumstances, such as law enforcement, it may be desirable to gain access to video data from the network node in real-time and in a clandestine way. One problem is that it is not known a priori which of the information streams carry video data.

To this end, one may attempt to process the traffic in accordance with an algorithm, e.g., as described in the aforementioned U.S. patent application Ser. No. 16/880,832, filed May 21, 2020. This operation may reveal which of the information streams carry unencrypted video data. However, such an approach does not necessarily reveal which of the information streams carry encrypted video data, nor does it allow access to the video data so encrypted.

To address this difficulty, if the total number of information streams passing through the network node is small, an attempt may be made to process all of the information streams individually and in parallel, under the hypothesis that any or all of the information streams may carry encrypted video data. An attempt may thus be made to "crack" the cryptographic key, if any, used by each information stream. This could be attempted at line speed for several streams by a device such as the Cloudshield CS-4000.

However, this approach quickly becomes impractical as the number of information streams passing through the network node increases, especially for covert operations that place constraints on the allowed physical footprint and available electrical power. As such, an alternative is needed, whereby information streams suspected of carrying encrypted video data can be singled out so that they can be dealt with separately, without affecting other information streams that are not suspected of carrying encrypted video data.

SUMMARY

According to a first broad aspect, there is provided a method for execution by a network element, comprising: (i) processing a plurality of information streams transiting the network element to identify a particular data stream as a suspected bearer of encrypted media, the particular data stream established between a first node and a second node; (ii) establishing a first control stream with the first node and a second control stream with the second node, wherein the first control stream is established using credentials associated with the second node; (iii) obtaining a cryptographic key sent by the first node over the first control stream and destined for the second node; (iv) sending the cryptographic key to the second node over the second control stream; (v) obtaining encrypted media sent by the second node and destined for the first node; and (vi) decrypting the encrypted media based on the cryptographic key.

According to another broad aspect, there is provided a method for execution by a network element located between a camera and a video management system (VMS), comprising: (i) identifying a data stream established between the camera and the VMS, the data stream carrying encrypted video data; (ii) causing the VMS to attempt to establish a control stream with the camera; (iii) using credentials associated with the camera to intermediate an exchange of control information between the camera and the VMS, wherein the control information includes (i) control information for establishment of a second data stream between the VMS and the camera and (ii) a camera-bound cryptographic key sent by the VMS; (iv) accessing over the second data stream VMS-bound encrypted video data send by the camera; and (v) decrypting the encrypted video data based on the cryptographic key.

According to another broad aspect, there is provided a computer-readable storage medium comprising computer-readable instructions which, when executed by a processor, cause the processor to carry out any of the above methods.

According to another broad aspect, there is provided an apparatus, comprising: (i) at least one first port for exchanging traffic with a first set of endpoints and at least one second port for exchanging traffic with a second set of endpoints, wherein the traffic comprises a plurality of information streams established between respective endpoints in the first set and respective endpoints in the second set; and (ii) a stream analysis unit connected to the first and second ports, the stream analysis unit configured for carrying out any of the above methods.

BRIEF DESCRIPTION OF THE DRAWINGS

Certain non-limiting embodiments will now be described with reference to the accompanying drawings, in which:

FIGS. 5B through 5K are block diagrams showing evolution of an example non-limiting process that is executed after identification of a data stream that is a suspected bearer of encrypted video data, and that concludes with decryption of the encrypted video data;

DETAILED DESCRIPTION

Figure 1:
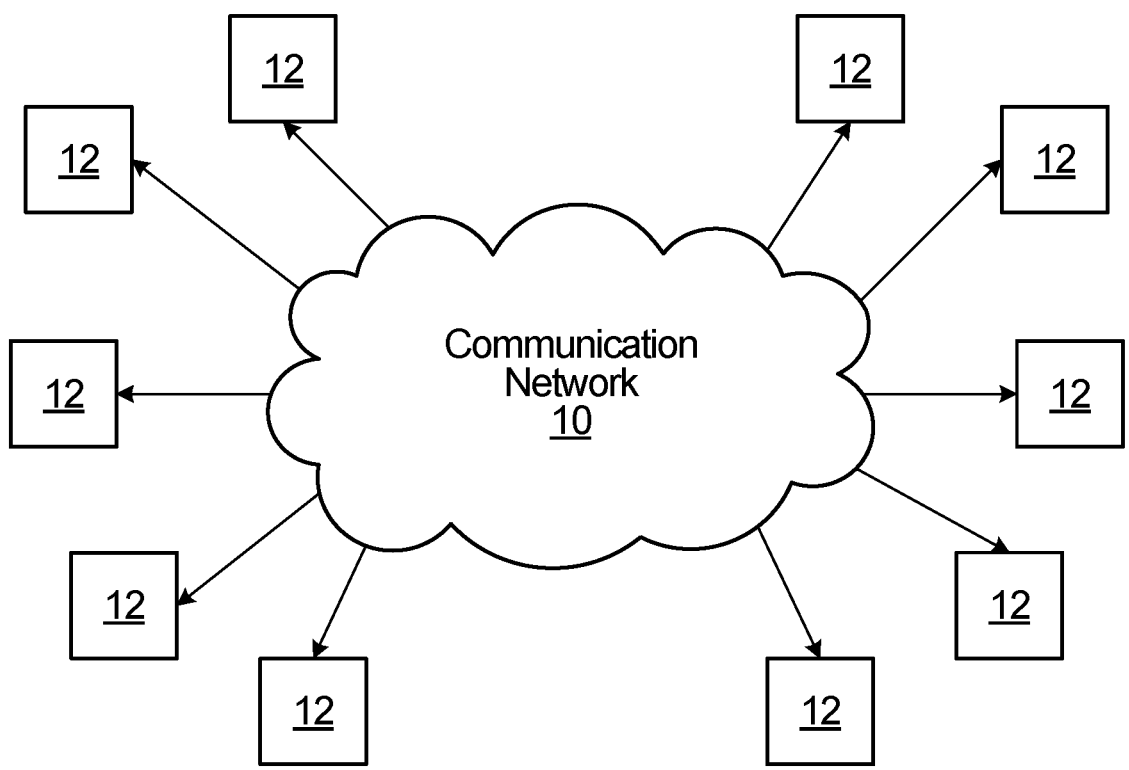
FIG. 1 is a block diagram showing a plurality of network elements in a packet-based communication network.

FIG. 1 is a conceptual block diagram of a packet-based communications network 10 used by a plurality of network elements 12 (or "endpoints", or "nodes") to communicate information streams amongst each other using packets, such as Internet Protocol (IP) packets. In some embodiments, information streams can be established between pairs of nodes 12, where each node in the pair is either a source node or a destination node, depending on the direction of communication. In other embodiments, information streams can be multicast from one source node to plural destination nodes.

Figure 2:
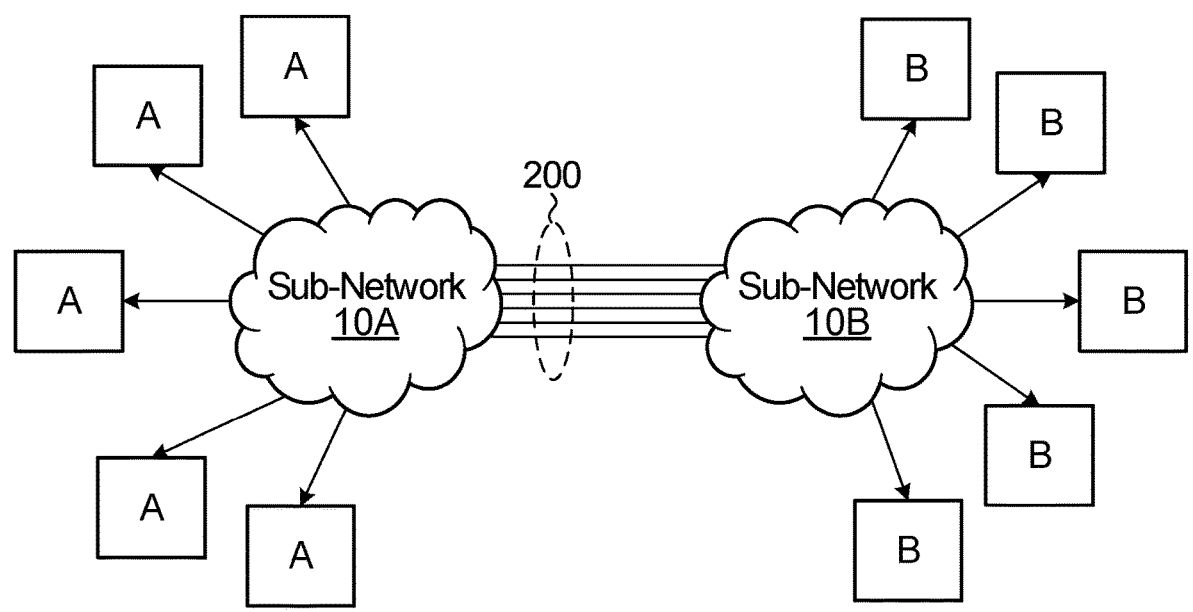
FIG. 2 is a block diagram showing the communications network of FIG. 1 arranged into two sub-networks and the network elements of FIG. 1 arranged into two subsets of network elements.

In the context of the present disclosure, and with reference to FIG. 2, it is useful to view the packet-based communication network 10 as being composed of a plurality of (in this case, two) sub-networks, namely sub-network 10A and sub-network 10B, where the plurality of nodes 12 is conceptually divided into two subsets of nodes, each subset being connected to a respective one of the sub-networks. Specifically, a first subset of the nodes, in which each node is denoted A, is connected to sub-network 10A, and a second subset of the nodes, in which each node is denoted B, is connected to sub-network 10B.

FIG. 2 shows a plurality of links between sub-network 10A and sub-network 10B so as to illustrate the specific non-limiting scenario in which individual information streams 200, which may be unidirectional or bidirectional, are exchanged between a particular node A in sub-network 10A and a particular node B in sub-network 10B.

Each of the information streams 200 is composed of a set of IP packets, each traveling from a source node to a destination node, whereby the source may be a particular node A or a particular node B, depending on the direction of communication. Each of the IP packets comprises a header and a payload structured in accordance with a suitable internet-layer protocol, such as IPv4 or IPv6, for example. The header of an IP packet indicates the source node and the destination node for that IP packet. The payload of an IP packet itself carries higher-order packets that abide by a certain "transport-layer protocol" and are characterized by an "information type", as now described in further detail.

Regarding the "transport-layer protocol", a variety of possibilities exist. One example of a transport-layer protocol is the transport control protocol (TCP), which is a connection-oriented point-to-point communication protocol that sends TCP packets as an unstructured stream of bytes in an ordered sequence. A TCP packet provides information from a sending node about the delivery of TCP packets transmitted to a destination node by using sequence numbers and acknowledgment messages. TCP ensures reliability, end-to-end delivery, resequencing and retransmitting of data until a timeout condition is reached or acknowledgment of TCP packets is received.

Another example of a "transport-layer protocol" is the User Datagram Protocol (UDP), which is a connectionless communication protocol used to establish loss-tolerant, low-latency data streams. A UDP packet is addressed with a port number and includes data and an optional checksum to verify data integrity upon receipt by the destination node. As UDP is connectionless and does not check the readiness of the destination node, the delivery or order of the UDP packets varies. UDP can reduce overall network traffic owing to a broadcast feature which broadcasts UDP packets to some computers on the same network and eliminates the need for duplication.

Other examples of a "transport-layer protocol" include, DCCP, SCTP and RSVP.

Structurally, with the understanding that a TCP packet and a UDP packet each reside in the payload of an IP packet (or stretched over the payloads of multiple IP packets), a TCP packet and a UDP packet each include their own header and payload. The size of the header of a TCP packet can be 20 bytes, whereas the size of the header of a UDP packet can be 8 bytes, for example. A TCP packet and a UDP packet can have common header fields, namely source address (e.g., source IP and/or MAC address), destination address (e.g., destination IP and/or MAC address), and checksum.

Furthermore, the payload of a TCP packet or a UDP packet is itself formatted in accordance with a still higher layer protocol referred to as an "application-layer protocol". Certain application-layer protocols are more suited to the transmission, latency and other characteristics of TCP, whereas others are more suited to the transmission, latency and other characteristics of UDP.

For example, TCP may be used to transmit application-layer packets that are in accordance with application-layer protocols such as file transfer protocol (FTP), simple mail transfer protocol (SMTP), hypertext transfer protocol (HTTP), HTTPs and Telnet. For its part, UDP may be used to transmit application-layer packets that are in accordance with application-layer protocols such as trivial file transfer protocol (TFTP), real-time streaming protocol (RTSP), simple network protocol (SNMP), DHCP, RIP, VOIP and domain name system (DNS) lookups to manage data transmission services across the communication network 10.

Regarding the "information type" associated with a particular information stream, suitable non-limiting examples include "control" and "data". An information stream that is a data stream may carry media such as audio or video or images. The media may be encrypted or unencrypted, e.g., encrypted video data or unencrypted video data. An information stream that is a media stream may carry parameters, passwords, cryptographic keys and other information needed to set up a data stream.

Those skilled in the art will appreciate that certain combinations of transport-layer protocol and application-layer protocol may be better suited to the transmission of control streams, and other combinations of transport-layer protocol and application-layer protocol may be better suited to the transmission of data streams. By way of non-limiting example, it may be more suitable for a control stream, as opposed to a data stream, to be transmitted using RTSP-over-TCP, or TLS-over-TCP. Also by way of non-limiting example, it may be more suitable for a data stream, rather than a control stream, to be transmitted using RTP-over-UDP.

Other examples of "application-layer protocols" include BGP, DHCP, IMAP, LDAP, MGCP, MQTT, NNTP, NTP, POP, PTP, ONC/RPC, RTP, RIP, SIP, SSH, and TLS/SSL. In combination with the underlying transport-layer protocol, some of these application-layer protocols may be more suitable for the carriage of data (e.g., encrypted or unencrypted media), whereas others may be more suitable for the carriage of control information.

Some application-layer protocols may allow the information they carry to be encrypted. This is the case with an application-layer protocol referred to as the Secure Real-time Transport Protocol (SRTP), as described in further detail in IETF RFC 3711 (tools.ietf.org/html/rfc3711), hereby incorporated by reference herein. SRTP can provide confidentiality, message authentication, and replay protection to the RTP traffic. SRTP provides a framework for encryption and message authentication of an RTP data stream. Conceptually, one may consider SRTP to be a "bump in the stack" implementation which resides between the RTP application and the transport layer. SRTP intercepts RTP packets and then forwards an equivalent SRTP packet on the sending side, and intercepts SRTP packets and passes an equivalent RTP packet up the stack on the receiving side. As such, the header for RTP and SRTP packets is same, whereas the payload is encrypted for SRTP packets.

Encryption is provided by a master key from which a relevant set of keys (encryption keys and salts, authentication keys, session keys, etc.) can be derived using a predetermined key derivation function. Thus, a key management protocol carried out by two endpoints needs to exchange only one master key, with all the necessary session keys, etc. being generated by applying the key derivation function. Periodic use of the key derivation function to generate a fresh set of keys may help prevent an attacker from collecting large amounts of ciphertext encrypted with one single session key. Furthermore, frequent use of the key derivation function to generate fresh sets of keys provides backwards and forward security in the sense that, for example, a compromised session key does not compromise other session keys derived from the same master key. This means that even if an attacker managed to recover, say, a session key, such attacker is not able to decrypt messages secured with previous and later session keys derived from the same master key. Conversely, a leaked master key reveals all the relevant keys derived from it, which is a feature that can be exploited by certain embodiments of the present disclosure, as discussed herein below.

As such, an external key management protocol is used to set up the initial master key over a control stream between two endpoints in the communications network 10. The control stream may be transmitted using an application-layer protocol such as RTSP or RTSP-over-TLS, which may use TCP as the transport-layer protocol. Examples of two key management protocols that may be used to set up the master key are ZRTP and MIKEY (described in RFC 3830, tools.ietf.org/html/rfc3830, hereby incorporated by reference herein); however, other methods exist and can be used to set up the master key. In the specific case of MIKEY, there is provided a multi-payload message where each payload describes a part of the context. One payload may be a "key data transport payload" (KEMAC), which contains the master key as well as the encryption and authentication algorithm to use to encrypt the media (e.g., video) over the SRTP data stream. To transmit the master key and other relevant encryption information (e.g., encryption and authentication algorithm), the key management extensions for RTSP described in RFC 4567 (tools.ietf.org/html/rfc4567, hereby incorporated by reference herein) may be used.

Many other possibilities and arrangements exist whereby encrypted video data is carried by a data stream and the information required to decrypt the encrypted video data is exchanged via a corresponding control stream between the same endpoints or nodes 12.

Figure 3:
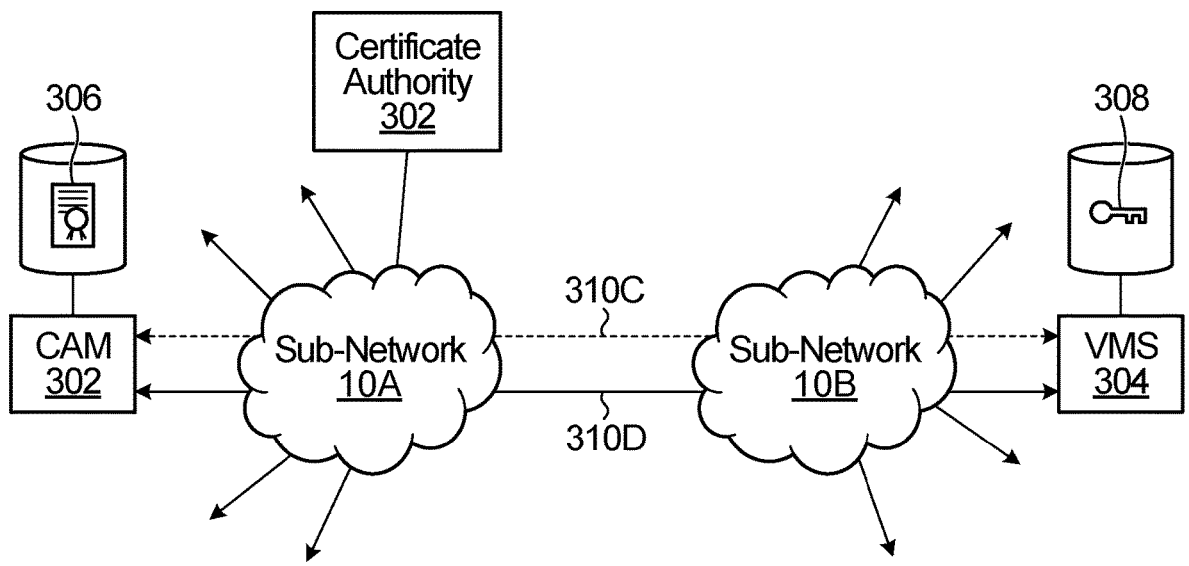
FIG. 3 is a block diagram showing a camera in communication with a video management system (VMS) over a control stream and a data stream, both of which traverse the sub-networks of FIG. 2.

In a non-limiting example of implementation, and with reference to FIG. 3, one of the nodes denoted A may be a camera 302 (e.g., a security camera), and one of the nodes denoted B may be a video management system (VMS) 304. The camera 302 is configured to identify itself to the VMS 304 by using a security certificate 306 obtained from a database, such as a certificate authority 312. To this end, in a non-limiting embodiment, the certificate authority 312 may be implemented as a web server accessible over sub-network 10A.

In some cases, the certificate authority 312 is the only legitimate distributor of the security certificate 306, in which case the certificate 306 associated with the camera 302 can only be validly obtained by the camera 302 itself, and there is a mechanism for the VMS 304 to confirm that when the security certificate 306 that was supposed to be distributed to the camera 302 is used by a node, that this node is indeed camera 302. However, in many practical instances, the security certificate 306 associated with the camera 302 can be obtained by other entities through publicly accessible databases or via a chain of trust, and also, in many practical instances, the VMS 304 merely validates the security certificate 306 as being a validly issued certificate without verifying whether the node that is using the security certificate 306 is the legitimate holder of the security certificate 306.

The camera 302 and the VMS 304 set up a control stream 310C over which the two nodes exchange control parameters for establishment of a data stream 310D. In addition, the control stream 310C is used for the exchange of at least one cryptographic data element to be used by the camera 302 for encryption of captured video data before transmission to the VMS 304 over the data stream 310D. The cryptographic data element is hereinafter referred to as cryptographic a key 308 which, in a non-limiting example, could be the master key, as described above in the context of MIKEY. By virtue of the exchange of the cryptographic key 308 and other information, the control stream 310C is used to set up the data stream 310D over which is carried encrypted video data. Encryption of captured video data may be performed by the camera 302 and decryption of the encrypted video data (in order to obtain the original, unencrypted video data) may be performed by the VMS 304.

Figure 4:
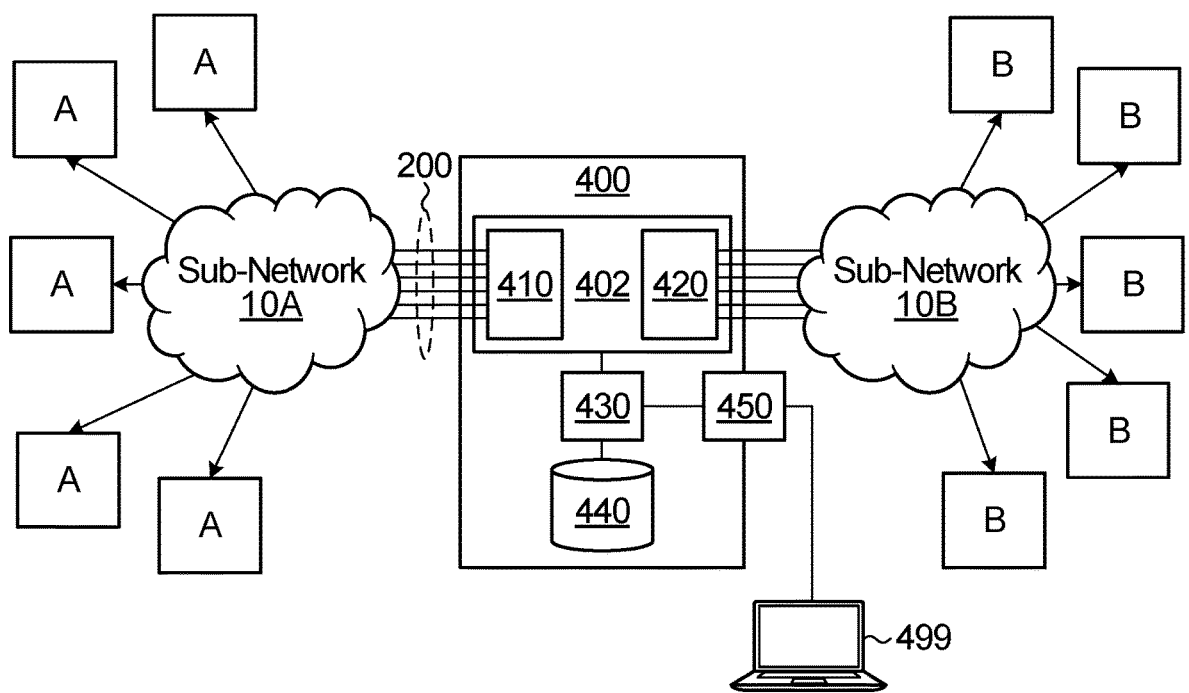
FIG. 4 is a block diagram showing an example non-limiting embodiment of an intermediate device for processing information streams established between one network element in each of the two subsets of network elements, such information streams including the control stream and the data stream established between the camera and the VMS.

In accordance with an embodiment of the present disclosure, and with reference to FIG. 4, an intermediate device 400 is placed in the communication network 10, specifically between sub-network 10A and sub-network 10B. In a non-limiting example of implementation, the intermediate device 400 may be inserted by (i) disconnecting an Ethernet cable from the RJ45 jack of an existing network element (such as a switch or router) and connecting this Ethernet cable to a first port 410 of the intermediate device 400; and (ii) connecting a second Ethernet cable connected to the second port 420 of the intermediate device 400 back into the RJ45 jack of the existing network element. As such, the aforementioned plurality of information streams 200 will pass through, and can be accessed by, the intermediate device 400.

An objective of the intermediate device 400 may be to extract unencrypted video data from those of the information streams 200 that are data streams carrying encrypted video data. An example of such a data stream carrying encrypted video data is the aforementioned data stream 310D between the camera 302 and the VMS 304. A challenge in achieving the objective of the intermediate device 400 is that the intermediate device 400 does not have a priori knowledge of which, if any, of the information streams 200 is a bearer of encrypted video data. In other words, even though the data stream 310D is passing through the intermediate device 400, the intermediate device 400 is at first unaware of this fact, as the data stream 310D is but one of many (possibly thousands) of other streams, including control streams and data streams of various types and in various formats and abiding by various protocols.

To this end, the intermediate device 400 comprises a stream analysis unit 430 connected to the first port 410 and to the second port 420. The stream analysis unit can be implemented using a microprocessor coupled to a memory 440 and a network interface 402. In some embodiments, the network interface 402 allows the stream analysis unit 430 to capture data from, or send data (either modified or unmodified) to, various network elements 12 of the communications network 100, including the camera 302, the VMS 304 and/or the certificate authority 312. In addition, in some embodiments, a second interface 450 may connect the intermediate device 400 to an external entity such as a console or laptop 499.

Figure 5A:
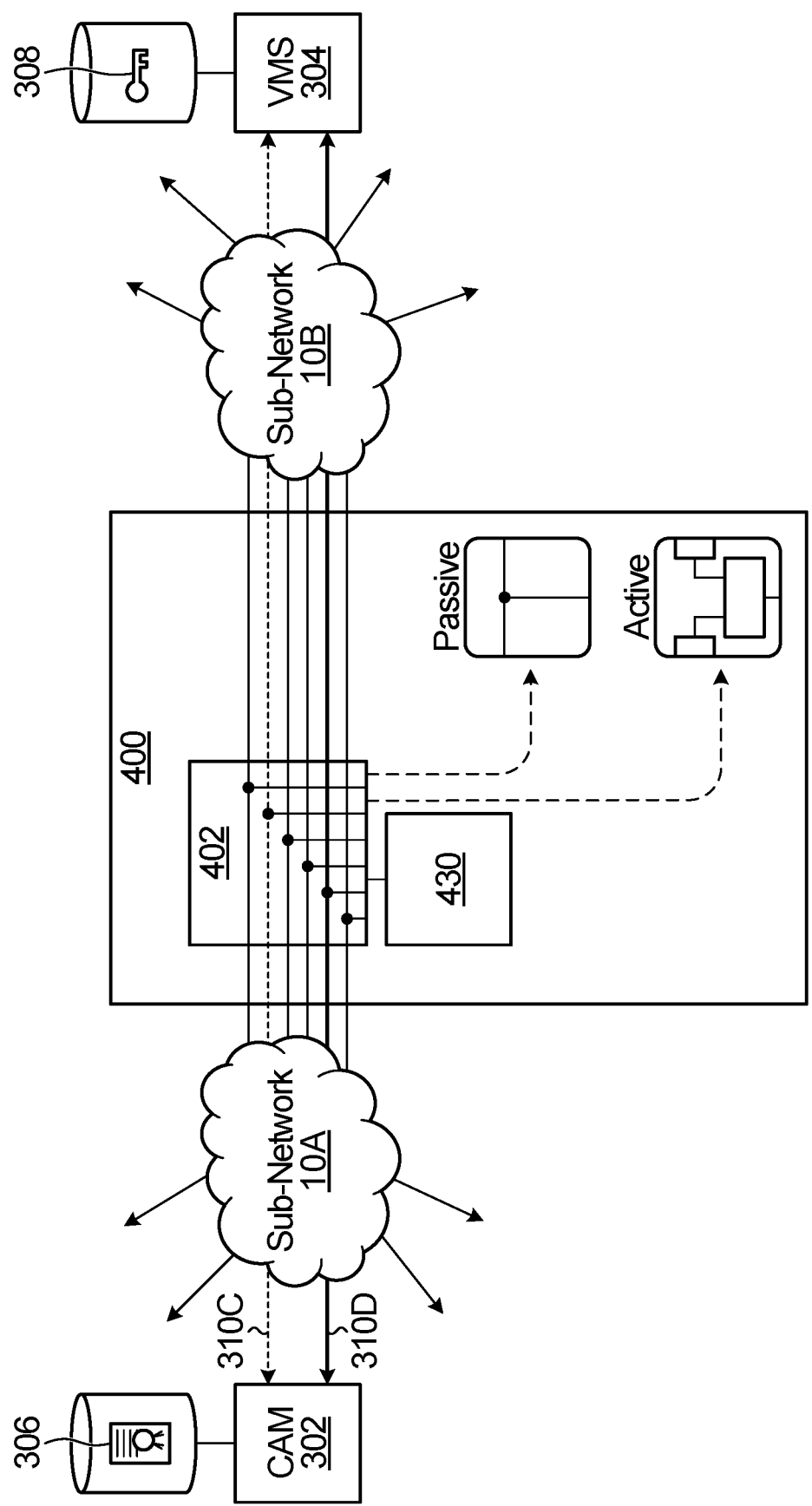
FIG. 5A is a block diagram showing access by the example non-limiting embodiment of the intermediate device to the data stream established between the camera and the VMS, in the context of a identifying a data stream that is a suspected bearer of encrypted video data, in accordance with a non-limiting embodiment.
Figure 5B:
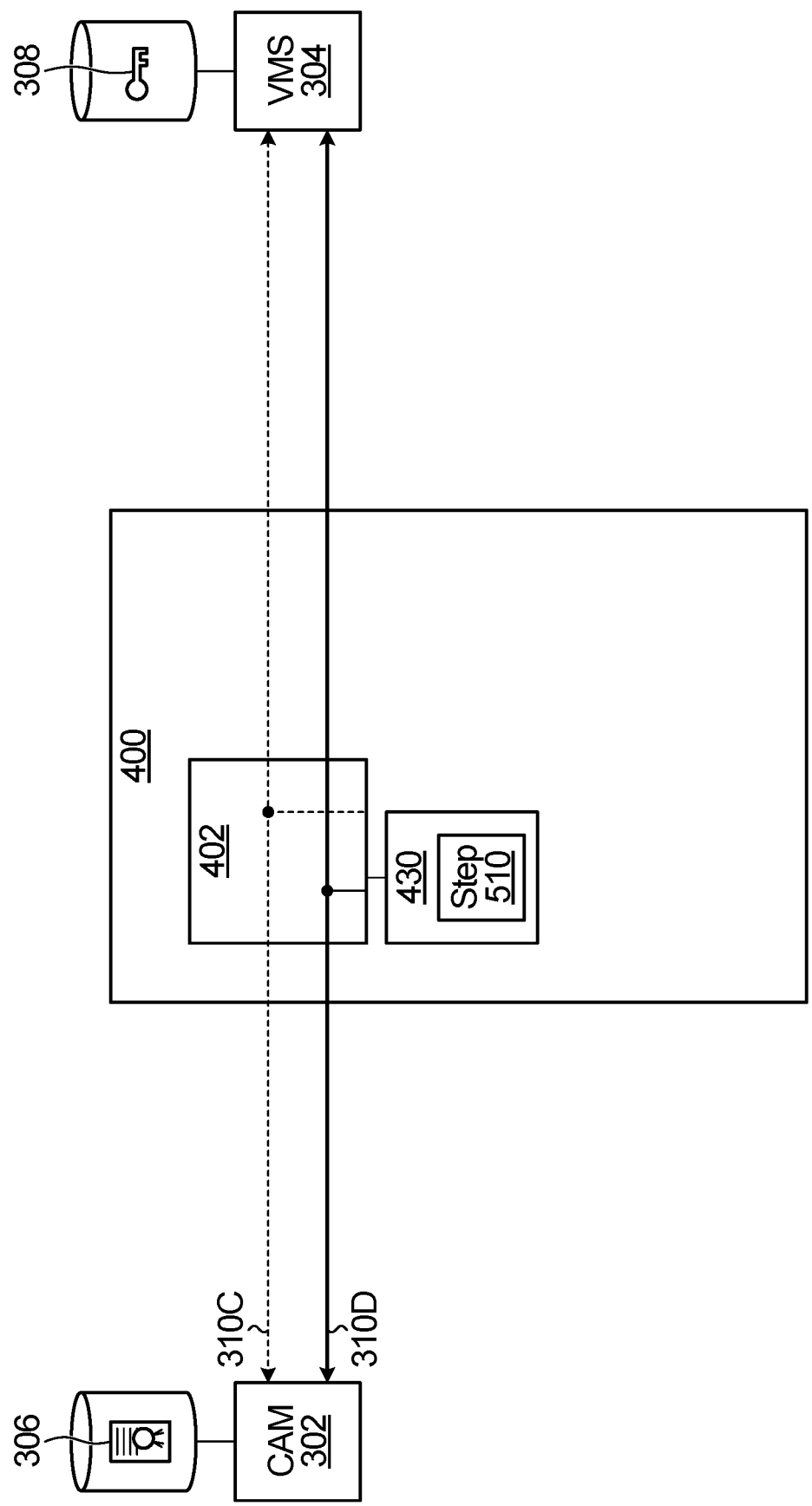

The stream analysis unit 430 is configured for carrying out a process that may assist in meeting the aforementioned objective, namely to extract unencrypted video data from those of the information streams 200 that are data streams carrying encrypted video data. In particular, and with reference to FIG. 5A, a first part of the process carried out by the stream analysis unit 430 includes (i) accessing the plurality of information streams 200 and (ii) processing this plurality of data streams to identify, among such data streams, at least one data stream as a suspected bearer of encrypted video data.

In order to access the plurality of information streams 200, passive or active techniques can be used. An example of a passive access technique may involve the use of a splitter to divert (or "tap"), using the network interface 402, a portion of the energy on the physical links (e.g., cables) to which the first port 410 and the second port 420 are connected, and to perform detection on the diverted signal, leaving the rest of the signal intact. In contrast, an example of an active access technique may involve using the network interface 402 to intercept the flow of IP packets between the first port 410 and the second port 420, read the content of the IP packets received from one port, and retransmit the IP packets via the other port. Active access techniques allow the possibility of modifying the data that is released from the intermediate device 400.

In order to identify, among the plurality of information streams 200, at least one data stream as a suspected bearer of encrypted video data, the stream analysis unit 430 may be configured to identify the nodes at the endpoints of such a data stream from the accessed signal. It is worth recalling from the discussion above that the accessed signal may be diverted or intercepted, depending on the type of system used for accessing the plurality of information streams 200. Specifically, the stream analysis unit 430 may be configured to process the IP packets in the accessed signal, to identify individual information streams by their endpoints, to identify the transport-layer protocol and the application-layer protocol of each individual stream and then to judge whether the data being transported is encrypted video data.

In the example case of the data stream 310D between the camera 302 and the VMS 304, presuming this to be an SRTP-over-UDP data stream, the stream analysis unit 430 may determine that there is a particular information stream whose endpoints are the camera 302 and the VMS 304. The stream analysis unit 430 may further determine that the information (i.e., data stream 310D) stream is an RTP-over-UDP signal, which would be indicative of a data stream. It is noted that the stream analysis unit 430 still does not know, at this point, that the data stream 310D is an SRTP-over-UDP stream, because the headers of RTP and SRTP packets may be indistinguishable. Accordingly, the stream analysis unit 430, still not knowing whether the video data being transported by the data stream 310D is encrypted, may apply a codec detection algorithm to try and determine whether the data carried by the data stream 310D corresponds to a known video codec in a set of known video codecs. As such, the techniques of U.S. patent application Ser. No. 16/880,832, filed May 21, 2020, may be employed. If the stream analysis unit 430 determines that the data carried by the data stream 310D (i.e., the information carried in the payloads of the packets) is in accordance with a video codec in the set of known video codecs, then the stream analysis unit 430 does not identify the data stream 310D as a suspected bearer of encrypted video data. On the other hand, if the stream analysis unit 430 determines that the data carried by the data stream 310D does not have a format that is in accordance with any of the video codecs in the known set of video codecs, then the stream analysis unit 430 identifies the data stream 310D as a suspected bearer of encrypted video data.

Of course, the foregoing provides merely one example way in which to identify a data stream that is a suspected bearer of encrypted video data. Other techniques may be used, including more direct techniques that rely on key parts of the header of a packet (such as an RTP extension or other ancillary header data) in order to establish that the data being carried by the packet is or may be encrypted video data, which would make the data stream a suspected bearer of encrypted video data. It is noted that the reference to a "suspected" bearer of encrypted video data covers the case whereby a given data stream is known to carry encrypted video data (i.e., when the suspicion is confirmed) but also the case whereby it is not confirmed that a given data stream carries encrypted video data, yet there is some indication that the given data stream does not carry at least one type of unencrypted video data.

In some embodiments, an information stream can be identified as a data stream that is a suspected bearer of encrypted video data based on a combination of various other features, such as the identity of the transport-layer protocol, the identity of the application-layer protocol, the endpoints and/or the bandwidth of the information stream (since higher bandwidth information streams may be indicate of video data of some kind). Another indicator may be the endpoints involved in the transmission, since certain known endpoints (either IP addresses or MAC addresses) may be found to be more likely to transmit or receive encrypted video data. For instances, some MAC addresses may be known to be associated with a camera manufacturer, and therefore data streams from those MAC addresses are expected to carry video data; if, in addition, the video data from such cameras is not decodable by any of a set of known codecs, then this may signify that the video data is encrypted, and therefore the data stream may be labeled, deemed or considered as a "suspected" bearer of encrypted video data.

Thus, in some embodiments, identifying a particular data stream as a suspected bearer of encrypted video data may comprise (i) determining if data carried by the particular is in accordance with one of a plurality of predetermined video codecs and (ii) concluding that the particular data stream is a suspected bearer of encrypted video data in case it is determined that the data carried by the particular data stream is not in accordance with any of the predetermined video codecs.

In other embodiments, identifying a particular data stream as a suspected bearer of encrypted video data may comprise applying a codec autodetection process to the payloads of the packets in the particular data stream in an attempt to identify an associated video codec and concluding that the particular data stream is a suspected bearer of encrypted video data in case the codec autodetection process fails to identify a video codec associated with the payloads.

In still other embodiments, identifying a particular data stream as a suspected bearer of encrypted video data may comprise processing the headers of the packets in the particular data stream to obtain information regarding a format of the payload and concluding that the particular data stream is a suspected bearer of encrypted video data in case the format of the payload corresponds to an encrypted video format.

In further embodiments, identifying a particular data stream as a suspected bearer of encrypted video data may comprise processing the headers of the packets of the particular data stream to obtain information regarding a source MAC address and concluding that the particular data stream is a suspected bearer of encoded video data in case the source MAC address is in a predetermined set of MAC addresses associated with encrypted video data.

In still other embodiments, identifying a particular data stream as a suspected bearer of encrypted video data may comprise determining a bandwidth of the particular data stream and concluding that the particular data stream is a suspected bearer of encrypted video data in case the bandwidth of the particular data stream exceeds a threshold.

Thus, it will be appreciated that identifying the nodes of a data stream that is a suspected bearer of encrypted video data (or, generally, encrypted media) may in some embodiments be carried out by checking for the presence of encrypted media directly in the payloads of the packets of the information streams 200 (for example, by running codec detection tests), whereas in other embodiments this may be carried out without checking for the presence of encrypted media in the payloads of the packets of the information streams 200 (for example, by processing only the headers, which may also include camera manufacturer or model information that may be associated with cameras known to produce encrypted video data). In other embodiments, both the headers and the payloads may be used to identify a data stream as a suspected bearer of encrypted video data.

Having identified the nodes of a data stream that is a suspected bearer of encrypted video data (in this case, data stream 310D between the camera 302 and the VMS 304), and recalling that an objective of the intermediate device 400 may be to extract unencrypted video data from such a data stream, a second challenge in achieving this objective is that the intermediate device 400 may not have a priori knowledge of the cryptographic key used to encrypt the video data. In this case, although the intermediate device 400 may suspect that the data stream 310D traveling between the camera 302 and the VMS 304 carries encrypted video data (as described above), the intermediate device 400 does not know the cryptographic key (in this case the cryptographic key 308) used by the camera 302 to encrypt the video data that it captures and sends to the VMS 304.

To address this challenge, the stream analysis unit 430 may be configured to carry out steps 510 through 550 now described with reference to FIGS. 5B through 5K. Specifically, with reference to FIG. 5B and step 510, the stream analysis unit 430 is configured for identifying a control stream established between the previously identified nodes associated with the data stream 310D between the camera 302 and the VMS 304 and that is a suspected bearer of encrypted video data. As such, the stream analysis unit 430 is configured to identify the control stream 310C used to communicate parameters and other control information (including the cryptographic key 308) between the camera 302 and the VMS 304. However, since the data stream 310D is already established and carries encrypted video data, the cryptographic key 308 would already have been transmitted from the VMS 304 to the camera 302 at some time in the past. In other words, it may be too late for the stream analysis unit 430 to capture the cryptographic key 308 by merely accessing (e.g., listening to) the control stream 310C.

Figure 5C:
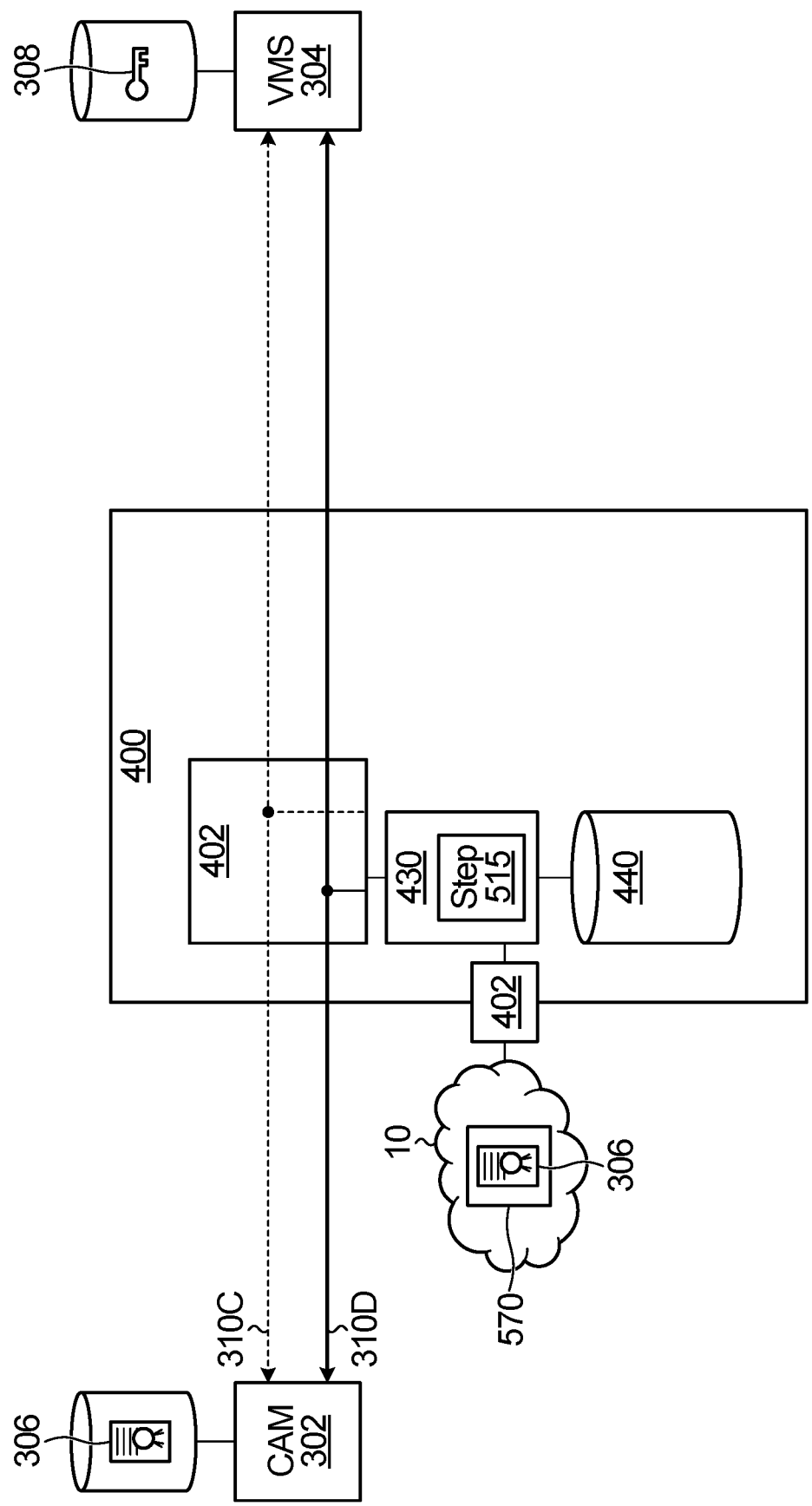

Accordingly, and with reference to FIG. 5C and step 515, the stream analysis unit 430 is configured for obtaining the security certificate 306 associated with the camera 302. The stream analysis unit 430 may be configured to obtain the security certificate 306 from a web server 570 by communicating with the web sever 570 over the communications network 10 via the network interface 402, but without having to authenticate itself as the camera 302. This is because there may exist sources of trusted security certificates other than the certificate authority 312. The web server 570 may be an example of such a source. In many practical applications, security certificates (such as the security certificate 306) are validly associated with a trusted node (such as the camera 302), and are considered trusted by the VMS 304 without verification by the VMS 304 that the security certificate is being provided by the trusted node. The stream analysis unit 430 is configured for storing the security certificate 306 (received from the web server 570) in the memory 440 of the intermediate device 400.

Figure 5D:
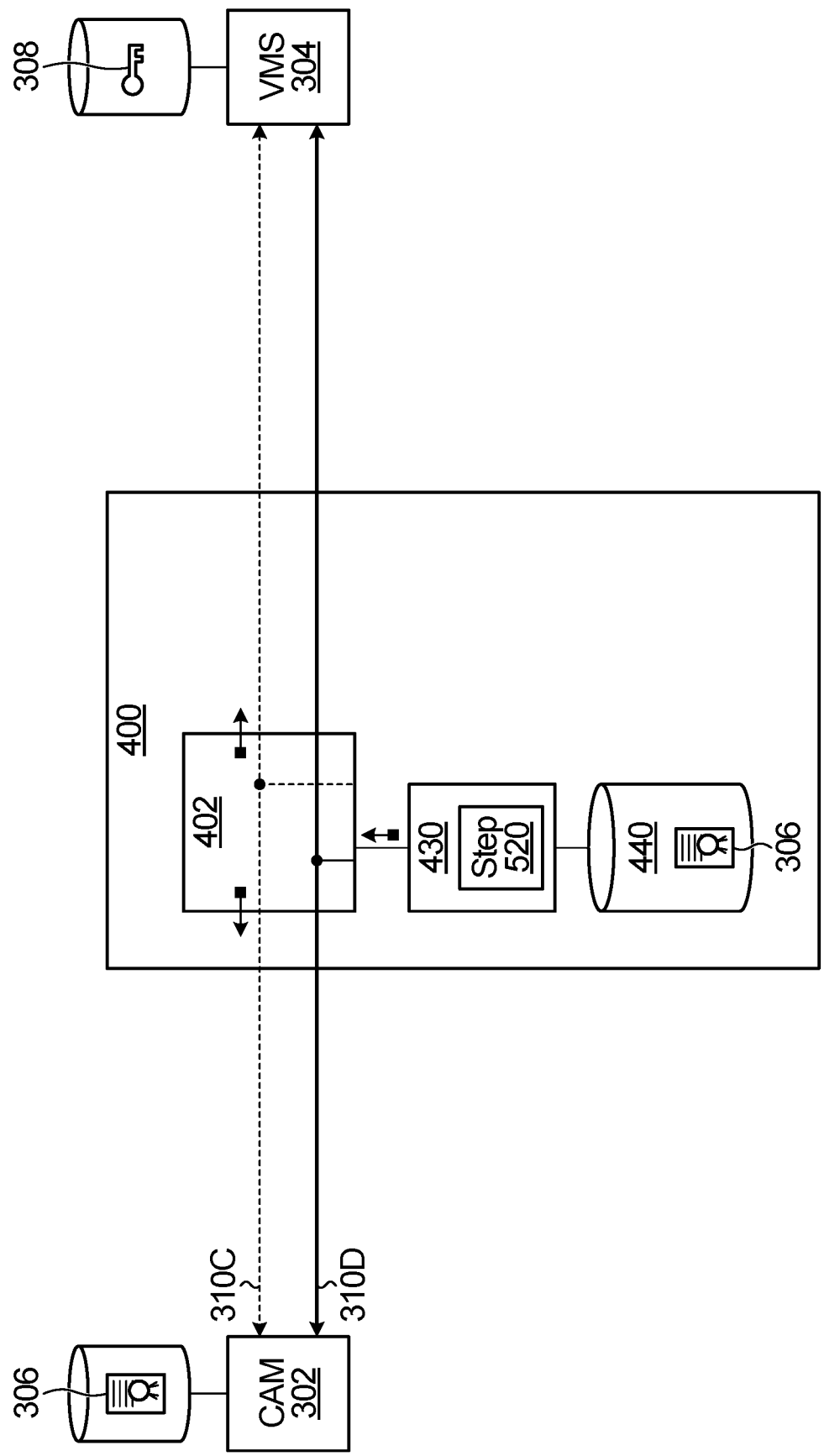
Figure 5E:
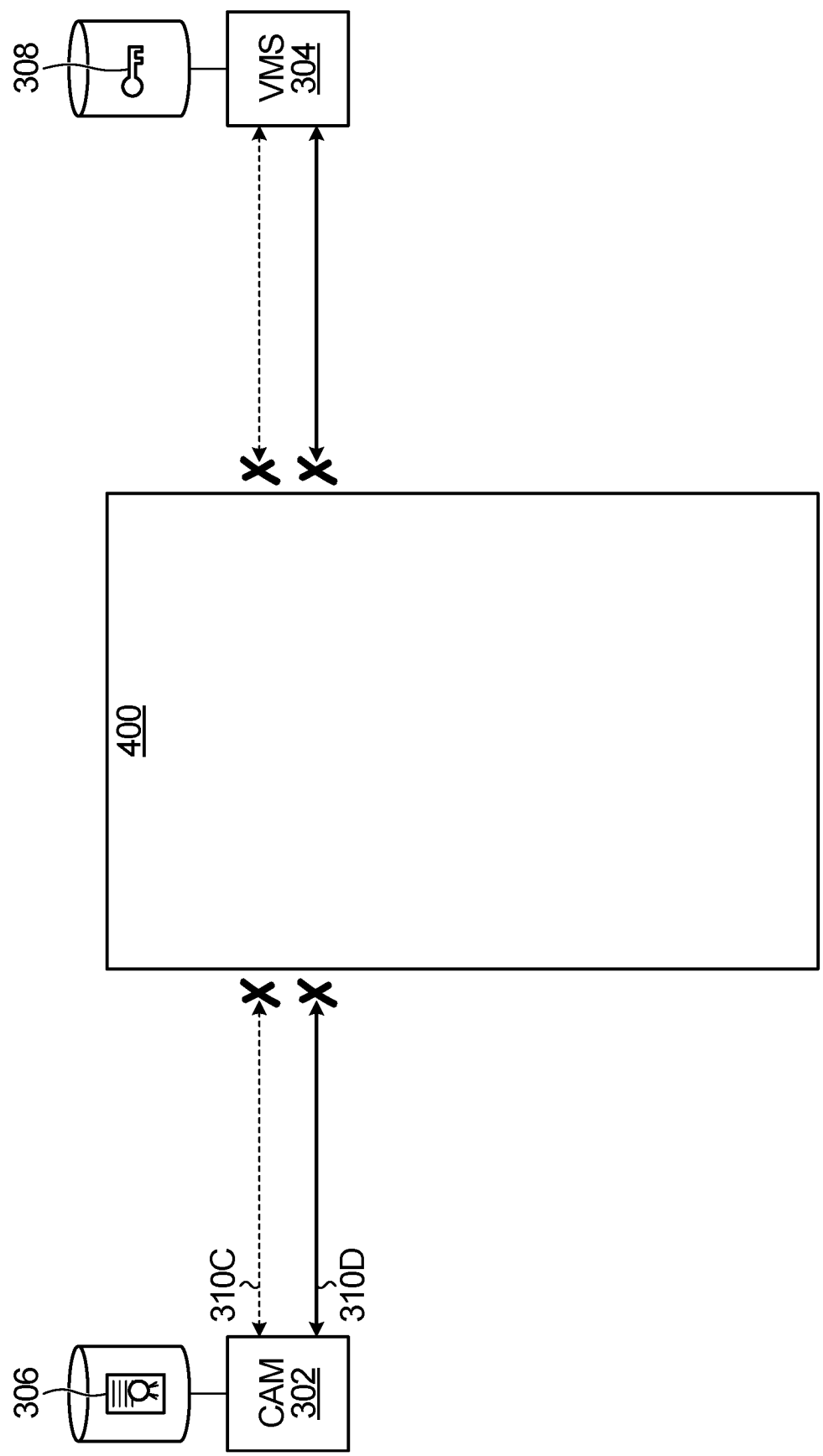

Next, with reference to FIG. 5D and step 520, the stream analysis unit 430 is configured to disrupt the control stream 310C. Specifically, the stream analysis unit 430 may be configured for triggering a reset of the camera 302 and/or the VMS 304. This may be done by sending one or more IP packets containing a reset command to the camera 302 and/or the VMS 304 via the network interface 402. In the non-limiting example scenario of the control stream 310C being an RTSP-over-TCP control stream, the reset command may be a TCP "RST" command, which may be sent to either or both endpoints of the control stream 310C between the camera 302 and the VMS 304. The reset command is received by the camera 302 and/or the VMS 304, following which the camera 302 may respond by ceasing transmission on the data stream 310D and the VMS 304 may respond by shutting down the control stream 310C (see FIG. 5E).

In another example of implementation, which may be particularly applicable to an active access scenario, disruption of the control stream 310C may occur by the stream analysis unit 430 being configured to block, discard, withhold or delay IP packets carried by the data stream 310D between the camera 302 and the VMS 304. It is recalled that these IP packets carry encrypted video data. As a result of the data stream 310D being affected in this way, the VMS 304 may respond by declaring a timeout and shutting down both the control stream 310C and the data stream 310D (see FIG. 5E)

After the control stream 310C has been disrupted in one of the above-described ways, the VMS 304 may be configured to initiate a restart process. For example, the restart process may include the VMS 304 attempting to establish a new control stream with the camera 302. According to an embodiment of the present disclosure, IP packets sent by the VMS 304 towards the camera 302 are intercepted by the intermediate device 400.

Figure 5F:
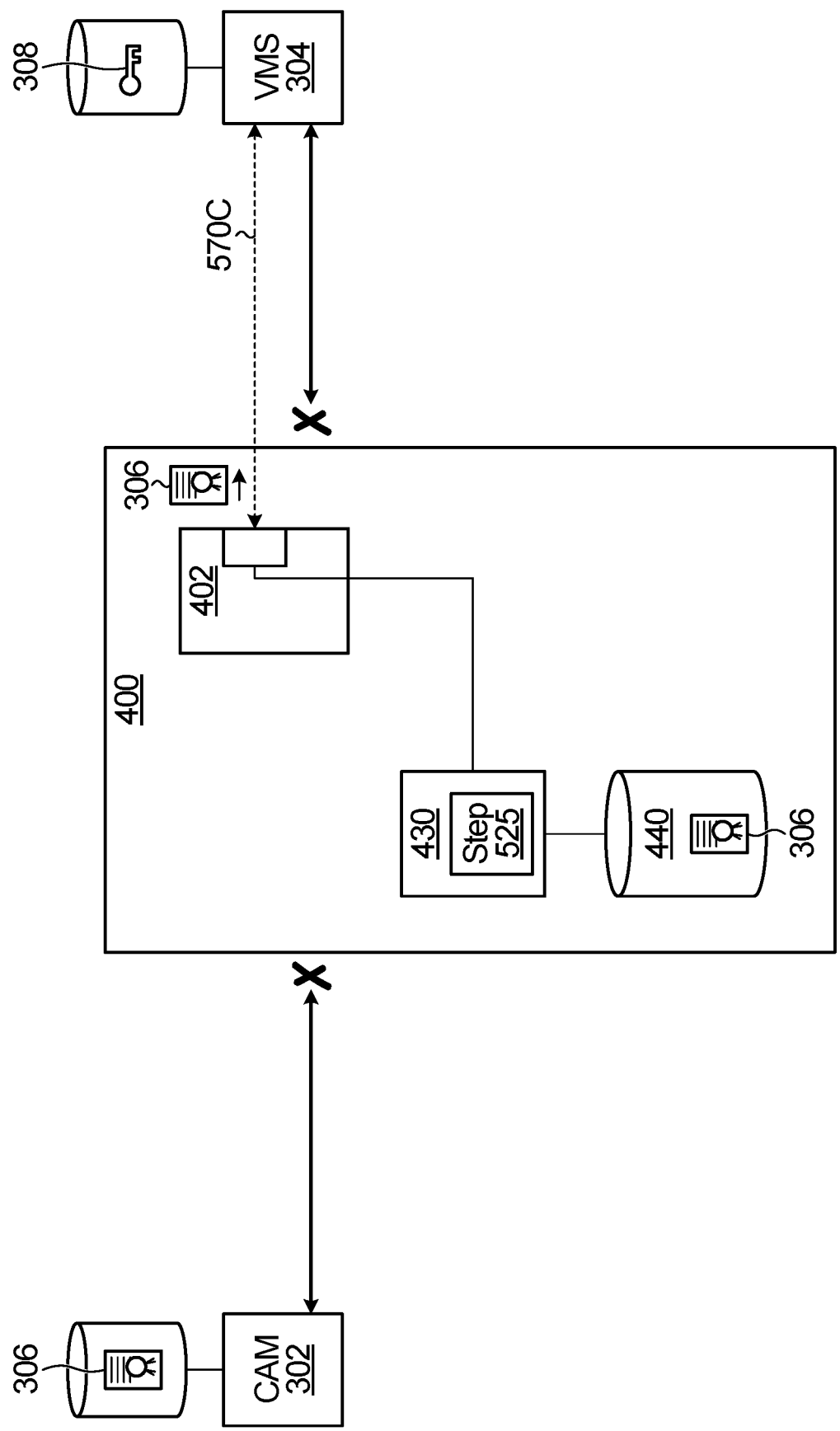

Specifically, with reference to FIG. 5F and step 525, the stream analysis unit 430 intercepts the IP packets from the VMS 304 and communicates with the VMS 304 to negotiate establishment of a first partial control stream 570C. Practically speaking, in a non-limiting example, this can be done by the stream analysis unit 430 redirecting received packets from the VMS 304 to a Berkeley TCP socket (with a possible TLS layer). In communicating over the first partial control stream 570C, the stream analysis unit 430 imitates operation of the camera 302. This may involve the stream analysis unit 430 extracting from the memory 440 the previously stored security certificate 306 associated with the camera 302 and providing the security certificate 306 to the VMS 304 to make the VMS 304 "believe" that the stream analysis unit 430 is the camera 302. This causes the VMS 304 to continue communicating with the stream analysis unit 430 as if it were the camera 302.

In addition, and with reference to FIG. 5G and step 530, the stream analysis unit 430 is configured for establishing a second partial control stream 580C with the camera 302. Practically speaking, in a non-limiting example, this can be done by the stream analysis unit 430 redirecting received packets from the camera 302 to a Berkeley TCP socket (with a possible TLS layer). In some embodiments, the stream analysis unit 430 obtains a valid set of credentials (e.g., a username and password) associated with the VMS 304 for establishing the second partial control stream 580C. As such, the stream analysis unit 430 intermediates the first and second partial control streams 570C, 580C.

Figure 5H:
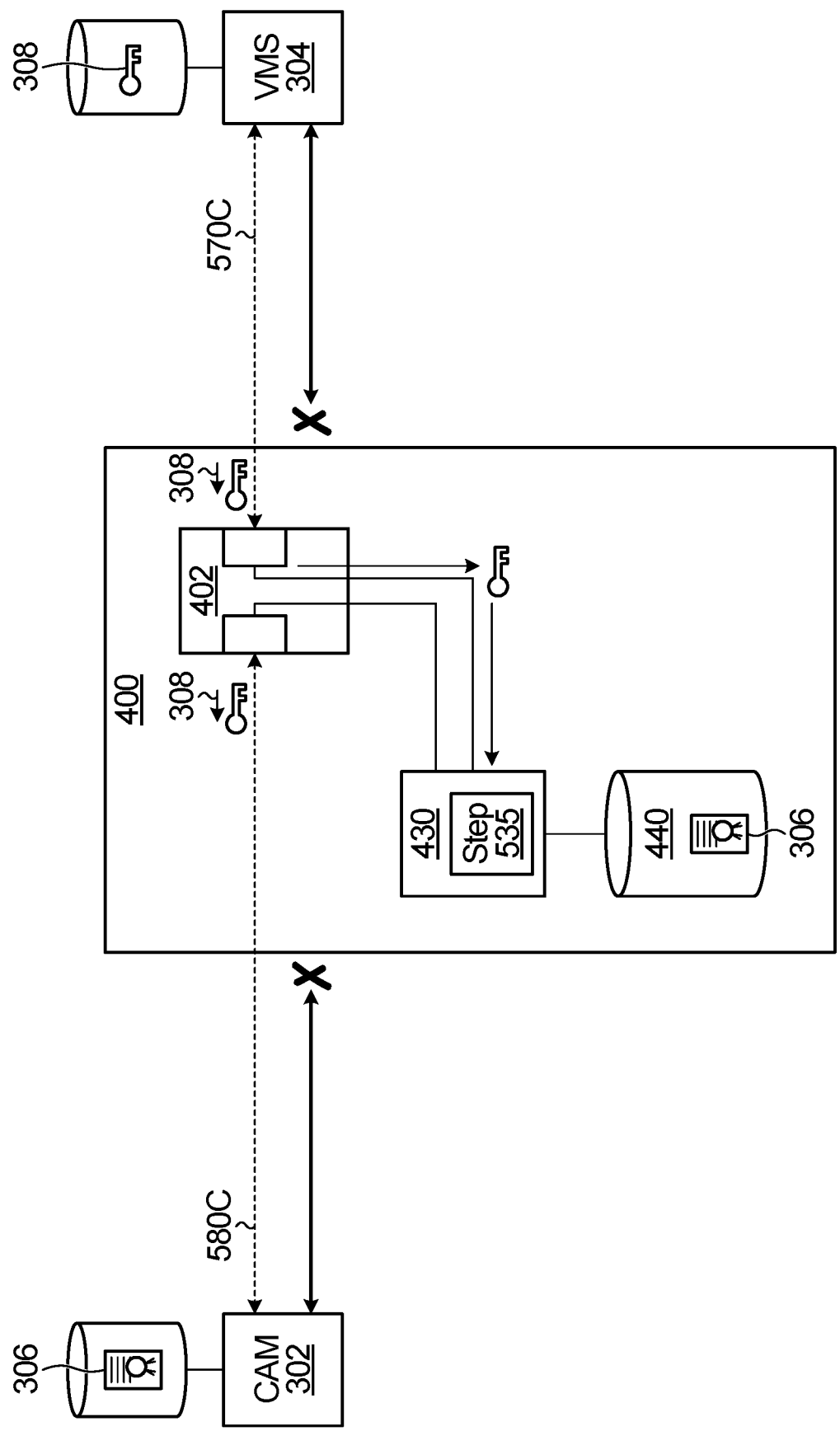

As shown in FIG. 5H and step 535, in the course of communication over the first control stream 570C (purportedly with the camera 302 but actually with the stream analysis unit 430), the VMS 304 sends the cryptographic key 308 that is to be used for eventual encryption and decryption of video data. The cryptographic key 308 may be sent by the VMS 304 autonomously or in response to a request made by the camera 302 over the second partial control stream 580C and relayed by the stream analysis unit 430 to the VMS 304. In either case, the stream analysis unit 430 is configured to intercept the cryptographic key 308 received from the VMS 304, to store it in the memory 440 and to send it to the camera 302 over the second partial control stream 580C. In this way, the stream analysis unit 430 obtains the cryptographic key 308, and the camera 302 also obtains the cryptographic key 308 but without knowledge that it was intercepted by the stream analysis unit 430.

Figure 5I:
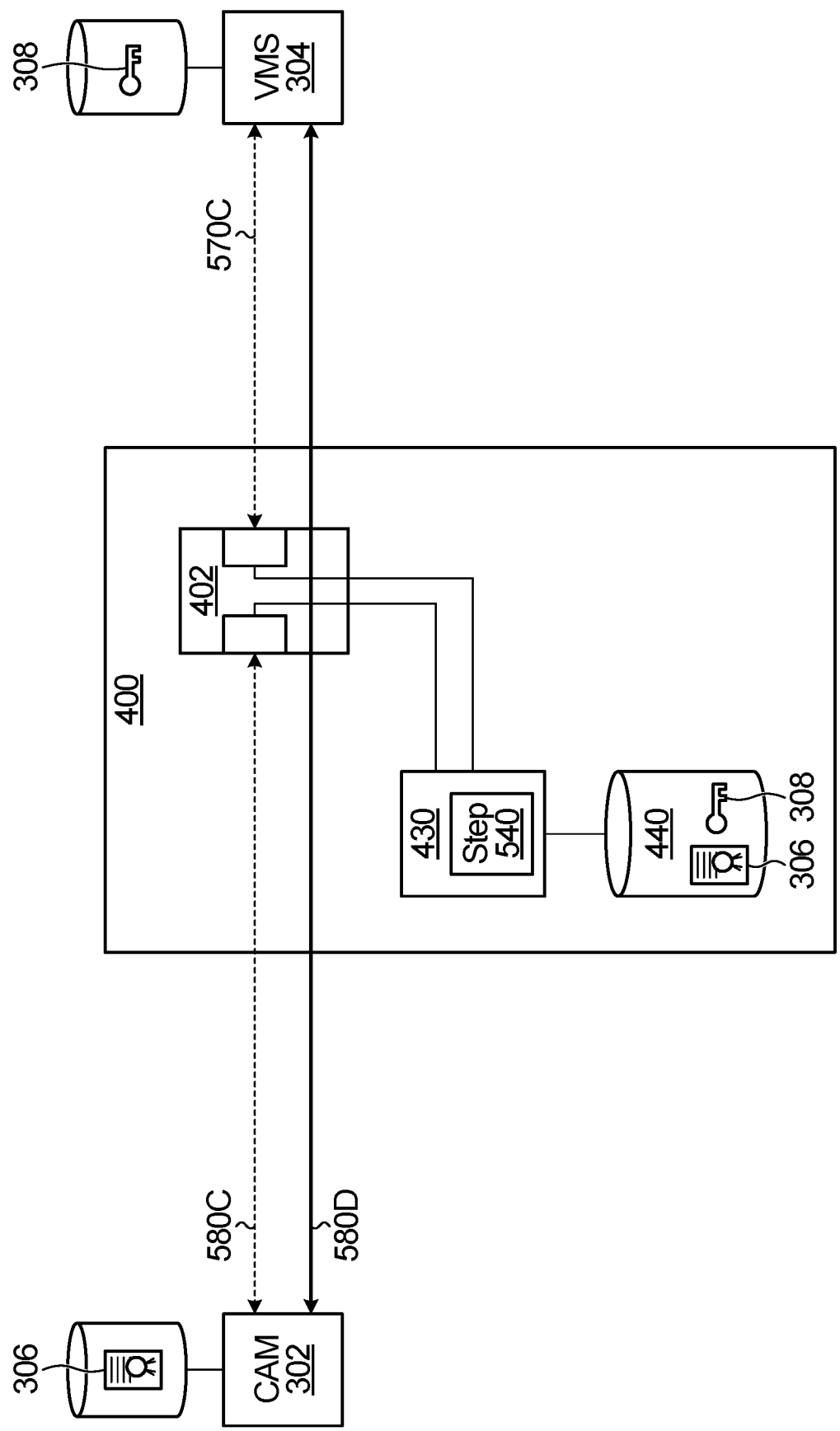

With reference now to FIG. 5I and step 540, the stream analysis unit 430 continues intermediating the partial control streams 570C, 580C, allowing a new data stream 580D to be established between the camera 302 and the VMS 304. It should therefore be appreciated that the data stream 580D may be established based on control information exchanged by the camera 302 and the VMS 304 over the first and second partial control streams 570C, 580C. Also, the data stream 58D may be a re-established version of the data stream 310D.

Figure 5J:
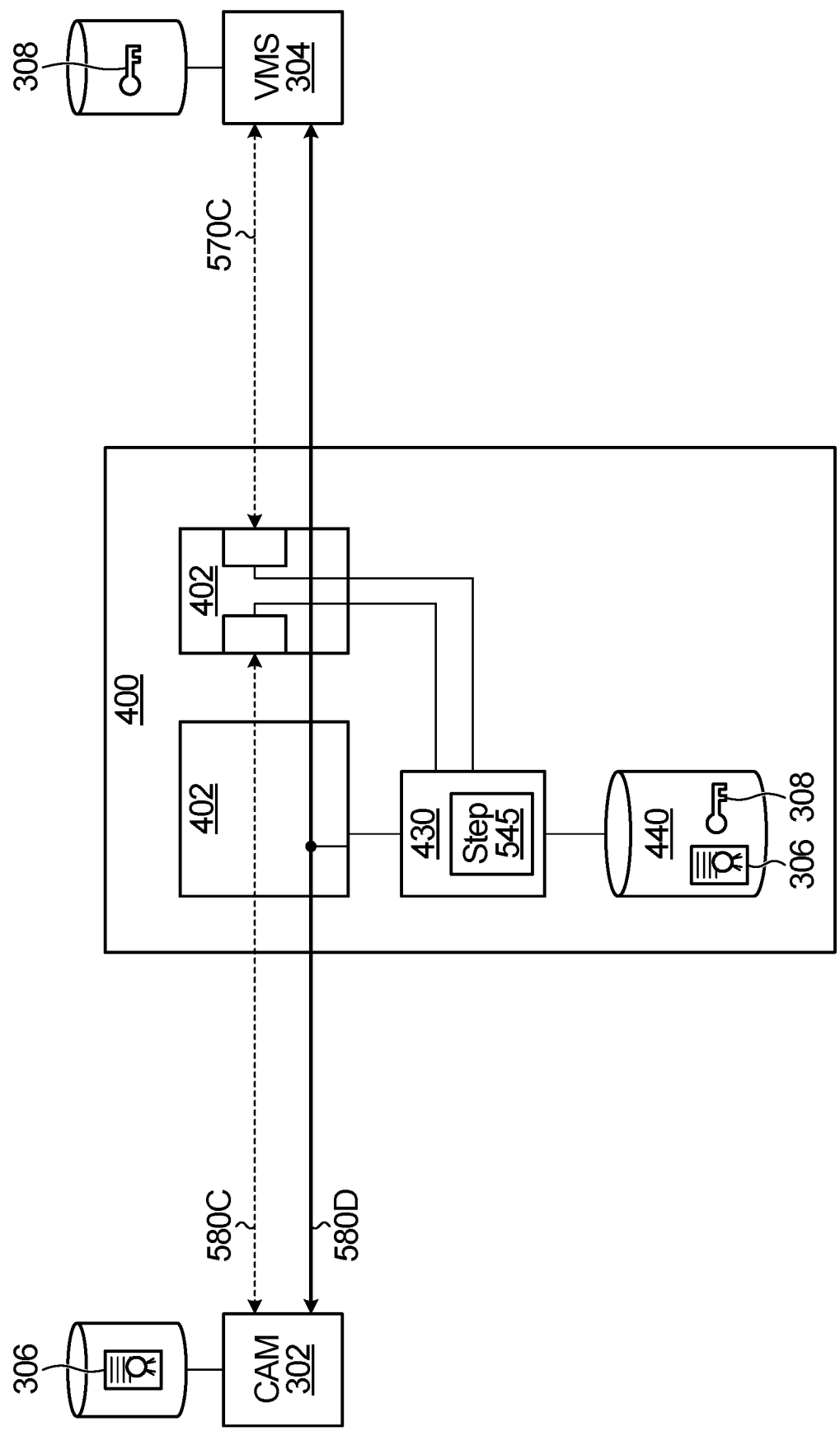

With reference to FIG. 5J and step 545, the stream analysis unit 430 is configured for accessing the information exchanged on the new data stream 580D, which includes capturing encrypted video data being transmitted by the camera 302. This encrypted video data carried by the data stream 580D will have been encrypted by the camera 302 using the cryptographic key 308 (or a new version thereof), but since the stream analysis unit 430 has also obtained this cryptographic key 308, the stream analysis unit 430 is positioned to decrypt the encrypted video data, in line with an objective of the intermediate device 400.

Figure 5K:
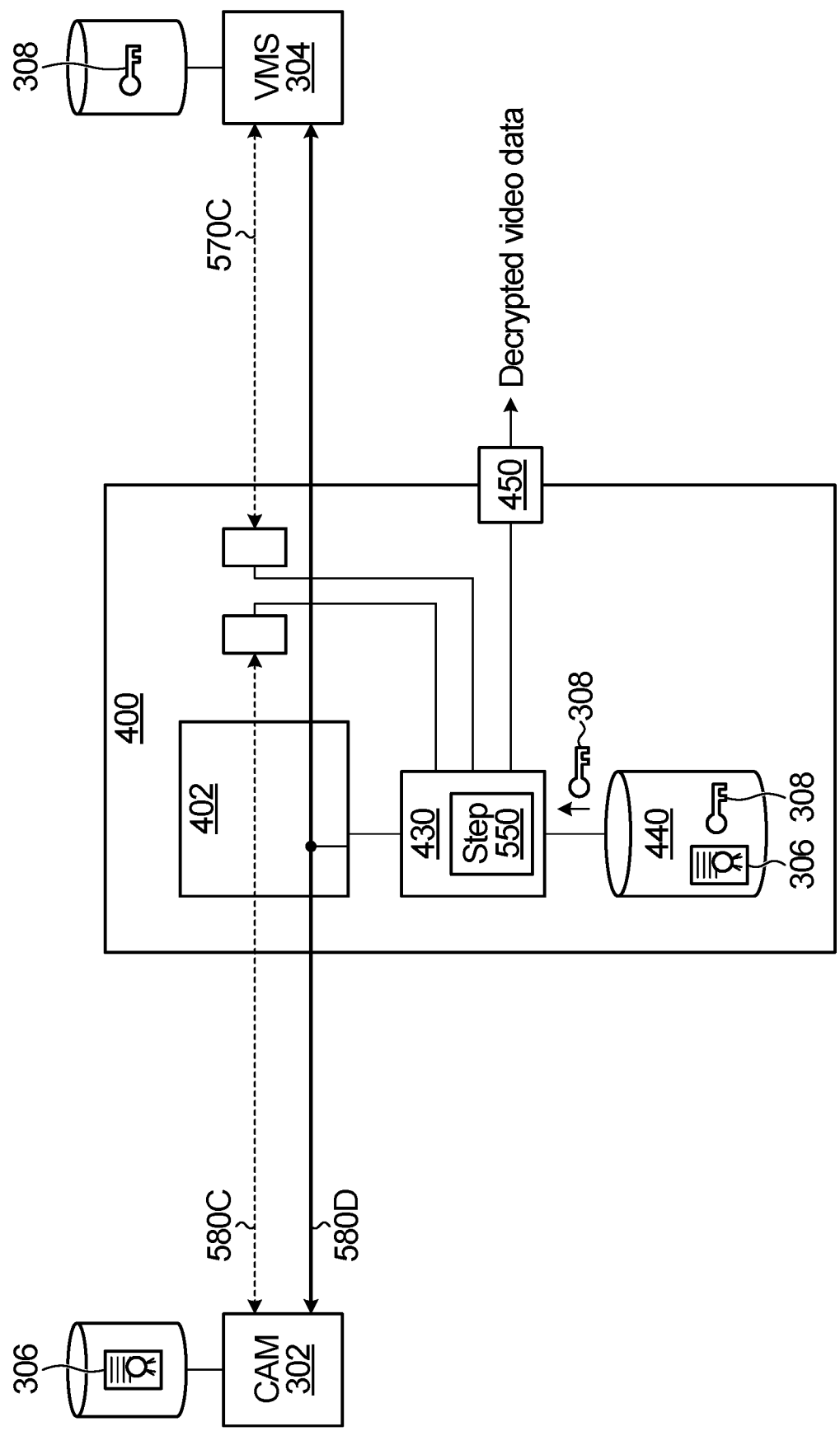

Specifically, with reference to FIG. 5K and step 550, the stream analysis unit 430 accesses the encrypted video data on the data stream 580D and decrypts it. This can be done on-the-fly (in real-time) using the previously obtained cryptographic key 308, and provided to the console or laptop 499 via the interface 450. Alternatively, the encrypted video data can be stored (still in encrypted form) in the memory 440 (or exported to an external memory) for later decryption using the cryptographic key 308.

Access to the data stream 580D may be achieved through passive or active mechanisms. It should be appreciated that in the scenario where access to the data stream 580D is achieved through a passive mechanism, the packets that reach the VMS 304 contain the same encrypted video data as was send by the camera 302. This may also be the case in the scenario where access to the data stream 580D is achieved through an active mechanism. However, an active access mechanism also allows the stream analysis unit 430 to send to the VMS 304 encrypted video data that is different from the encrypted video data received from the camera 302. Specifically, the memory 440 may include substitute video data (e.g., a security video loop) that is stored as having been pre-encrypted by the cryptographic key 308 or may be encrypted in real-time by the stream analysis unit 430. The resulting encrypted substitute video data may then be inserted into the payload of the packets (e.g., SRTP-over-UDP packets) sent to the VMS 304 via the network interface 402 and the data stream 580D. In this way, a user of the VMS 304 may be "tricked" into thinking that the camera 302 is transmitting the substitute video data, which may be unlikely to arise suspicion by a viewer or user since the viewer or user knows that encryption is being used, i.e., the data stream 508D is encrypted, thus providing a sense of security which, as it turns out, would be misleading to the viewer or user.

It is noted that in a symmetric encryption scenario, the same cryptographic key 308 is used in both the encryption process and the decryption process. However, an asymmetric encryption scenario may be implemented, in which the cryptographic key 308 is an encryption key used for the encryption process, and this cryptographic key 308 is used by the stream analysis unit 430 to access or derive a different, but corresponding decryption key (not shown) which is used for the decryption process.

Figure 6:
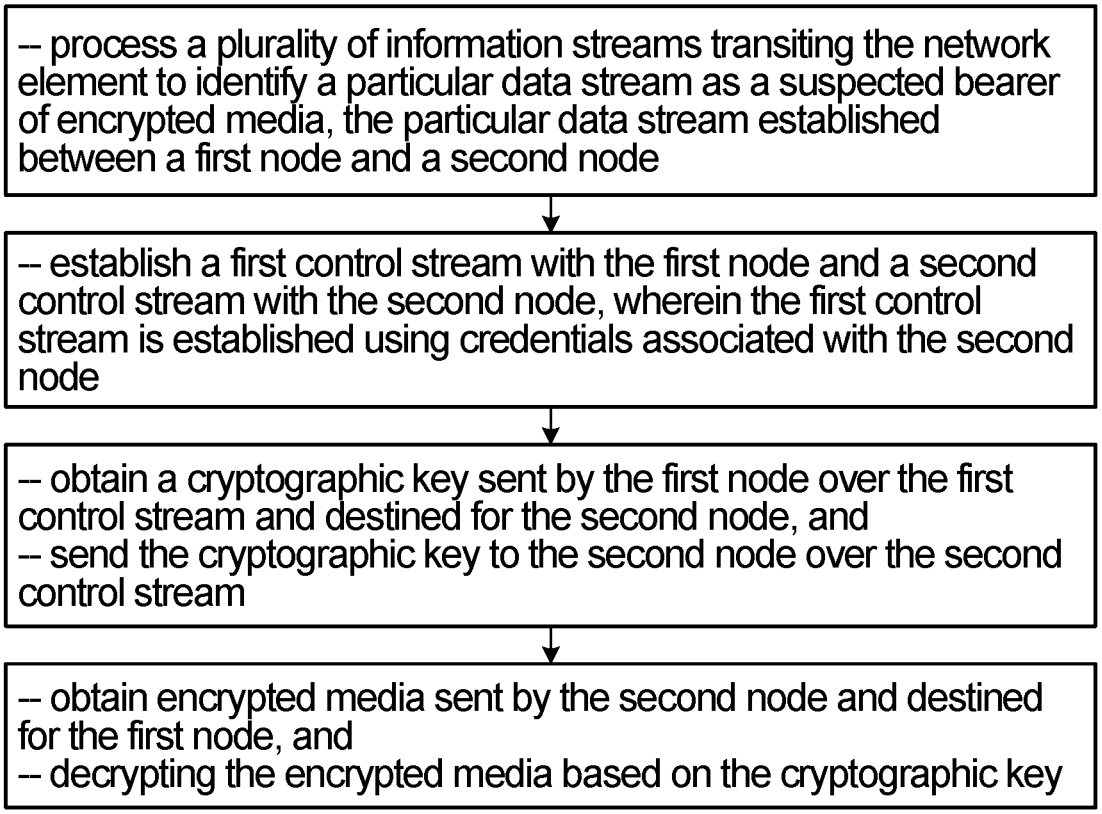
FIG. 6 is a flowchart showing steps in the aforementioned non-limiting example process shown by way of non-limiting example in some of FIGS. 5A through 5K.

As such, the stream analysis unit 430 can be viewed as implementing an algorithm characterized by the flowchart of FIG. 6, wherein, at step 610, a plurality of information streams is accessed and, among the plurality of information streams, there is identification of a particular data stream as a suspected bearer of encrypted video data, the particular data stream being associated with a first node and a second node. Step 620 includes establishing a first control stream with the first node and a second control stream with the second node, wherein the first control stream is established using credentials associated with the second node. At step 630, the method comprises obtaining a cryptographic key sent by the first node over the first control stream and destined for the second node and sending the cryptographic key to the second node over the second control stream. At step 640, encrypted media sent by the second node and destined for the first node is received and decrypted based on the cryptographic key.

The stream analysis unit 430 can also be viewed as implementing a process that includes identifying a data stream 310D established between the camera 302 and the VMS 304, the data stream carrying encrypted video data; causing the VMS 304 to attempt to establish a control stream with the camera 302; using credentials associated with the camera 302 to intermediate an exchange of control information between the camera 302 and the VMS 304, wherein the control information includes (i) control information for establishment of a second data stream 580D between the VMS 304 and the camera 302 and (ii) a camera-bound cryptographic key 308 sent by the VMS 304; accessing over the second data stream 580D VMS-bound encrypted video data send by the camera 302; and decrypting the encrypted video data based on the cryptographic key 308.

Those skilled in the art will appreciate that even though the encrypted video data has been decrypted, the video data will still have been encoded with a codec. One challenge is that the stream analysis unit 430 may not know with which codec was used to encode the video data. Accordingly, the stream analysis unit 430 may apply a codec detection algorithm to try and determine whether the video data was encoded by a common video codec. As such, the techniques of U.S. patent application Ser. No. 16/880,832, filed May 21, 2020, may be employed. This may result in passing the video data through a number of tests associated with various codecs. Specifically, at least the header of a packet of video data may be processed to determine a flow associated with the packet. Then, at least part of the payload of the packet may be processed to determine a candidate payload structure of the packet and at least part of the payload of the packet may be processed in accordance with the candidate payload structure, which includes processing at least part of the payload of the packet in accordance with one or more codec-specific tests.

If the stream analysis unit 430 successfully determines that the test associated with a particular codec is passed, then the stream analysis unit 430 may output the identity of this codec and may even proceed to decode the data using this codec, for presentation on a screen.

On the other hand, if the stream analysis unit 430 determines that the data carried by the data stream 310D does not correspond to a common video codec, then the stream analysis unit 430 identifies the data stream 310D as a suspected bearer of encrypted video data.

Figure 7:
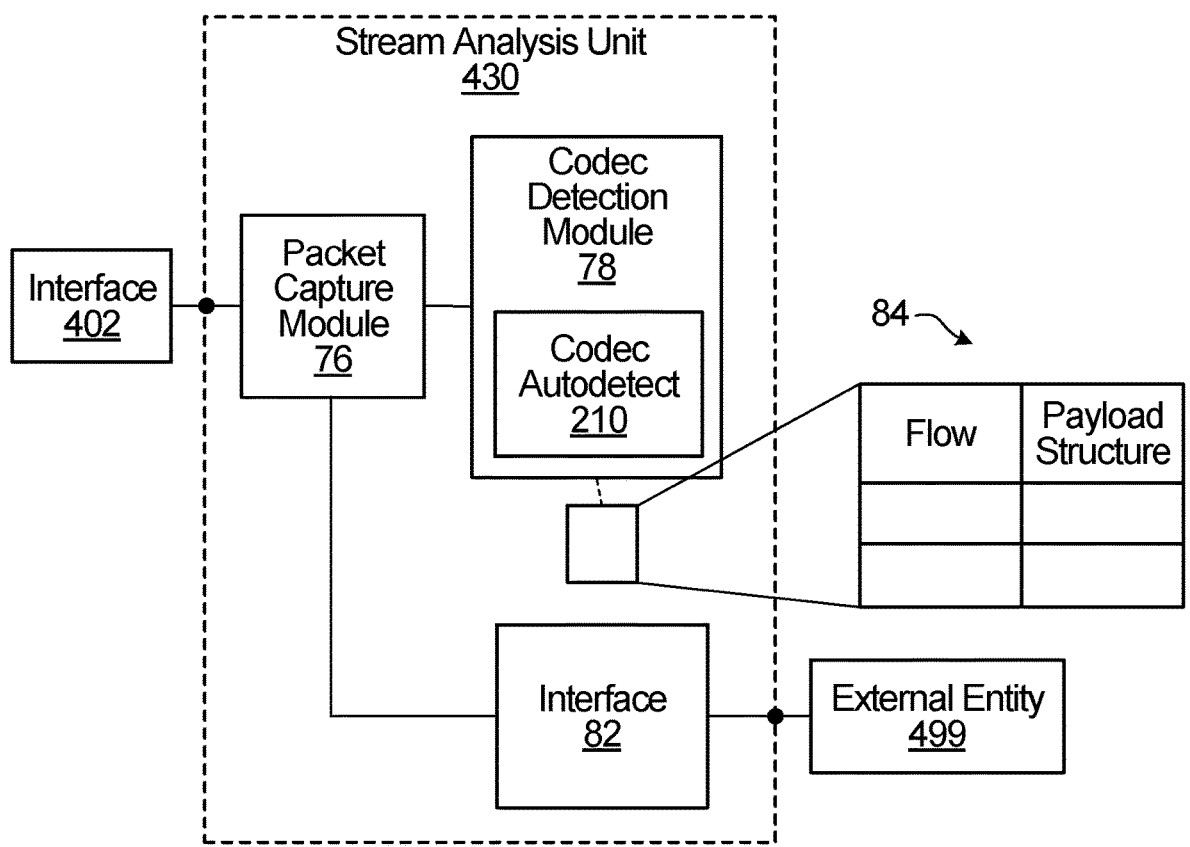
FIG. 7 is a block diagram showing a table used by the stream analysis unit in the context of a codec autodetection process, in accordance with a non-limiting embodiment.

To this end, and with reference to FIG. 7, the stream analysis unit 430 may implement a surveillance module configured for processing the signal received via the interface 420 (which may be passive (e.g., a tap) or active). The signal carries packets (e.g., IP packets) associated with a given information stream (such as a data stream). The signal is fed to a packet capture module 76. The packet capture module 76 is configured to the detect packets in the information stream. The packets detected by the packet capture module 76 are fed/copied to a codec detection module 78.

Figure 8:
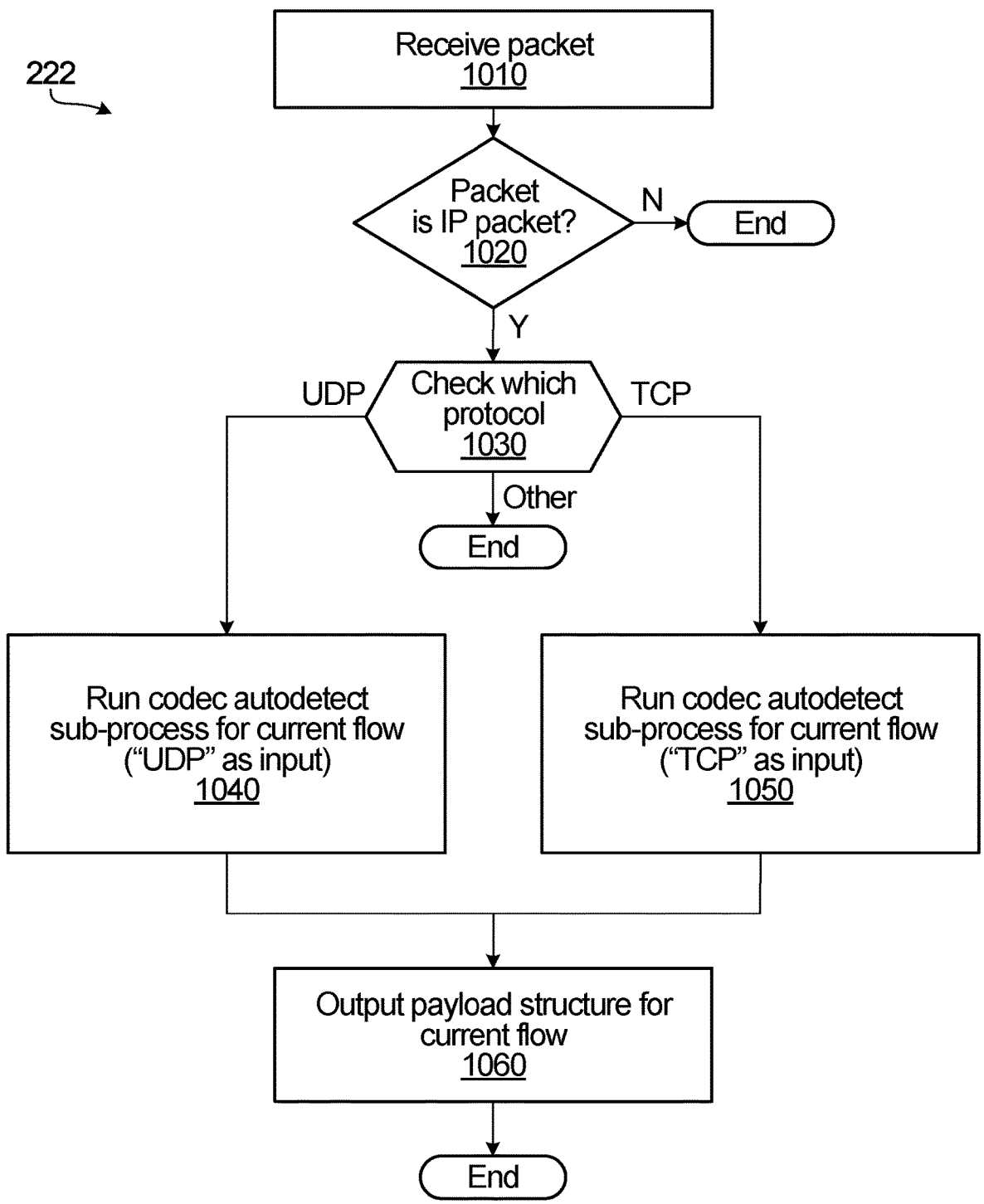
FIG. 8 is a flowchart showing steps in the codec autodetection process, in accordance with a non-limiting embodiment.

The codec detection module 78 carries out a codec detection process 222 which is now described generally with reference to the flowchart in FIG. 8. At step 1010, an IP packet is received from the packet capture module 76. A purpose of the codec detection process 222 may be to discriminate between two main possibilities: (1) the packet contains unencrypted video data that is coded in a format that can be recognized and (2) the packet does not contain unencrypted video data in a format that can be recognized. If the packet does indeed contain unencrypted video data that is coded in a format that can be recognized, then this means that the packet would have a certain payload structure, and therefore the outcome of the codec detection process 222 could be the flow of the packet (e.g., combination of endpoints and other identifying information) as well as the corresponding payload structure (if correctly determined), which should then allow the stream analysis unit 430 to confirm that the given information stream carries unencrypted video data.

On the other hand, if the packet does not contain coded video data (or contains coded video data that the codec detection module 78 is unable to detect), then the outcome of the codec detection process 222 would be either nothing or an indication of the flow of the packet together with an indication that there was no detectable coded video in the packet. This could be used by the stream analysis unit 430 as an indication (although not necessarily proof) that the given information stream carries encrypted video data.

Accordingly, at step 1020, the codec detection process 222 includes determining whether the received packet is an IP packet. If not, the packet may be ignored or discarded. If yes, the next step is step 1030, whereby the codec detection process 222 includes attempting to check the lower-layer communication protocol (e.g., transport-layer protocol) used by the IP packet. If none can be identified, then the process may terminate. In case the communication lower-layer communication protocol is UDP, the codec detection process 222 proceeds to step 1040, whereby a codec autodetect sub-process 210 is carried out for the current flow with the input variable "UDP"; in case the lower-layer communication protocol is TCP, the codec detection process 222 proceeds to step 1050, whereby the codec autodetect sub-process 210 is carried out for the current flow with the input variable "TCP".

The codec autodetect sub-process 210 may include some initial processing of the payload of the received packet to determine a candidate payload structure of the received packet. This is still only a candidate payload structure because it is based on some initial information in the payload of the received IP packet, which will need to be confirmed by individual codec testing. Accordingly, this is followed by some processing of the payload of the received packet in accordance with this candidate payload structure, which includes processing the payload of the received packet in accordance with one or more tests, each test associated with a specific codec. If a given test of the one or more tests is passed, this can be viewed as confirming the candidate payload structure, and an association is created between the current flow and at least the candidate payload structure. The output of the codec autodetect sub-process 210 (carried out at step 1040 or step 1050) is thus identity of the candidate payload structure as well as the codec for which the test was ultimately passed (if any). In the present embodiment, the codec detection process 222 then proceeds to step 1060, an association between the current flow and this candidate payload structure may be created.

The association between the current flow and the candidate payload structure may be stored in a table 84. Specifically, the table 84 may include records each containing a "flow" field that specifies the parameters of a given flow (e.g., any suitable combination of source address, destination address, source port, destination port, MAC address, etc.), as well as a "payload structure" field that specifies the payload structure (e.g., RTP/UDP, RTSP-I/TCP, HTTP MJPEG multipart) that was found to be associated with the given flow. The payload structure may also be viewed as a combination of application-layer and transport-layer protocol.

It should be appreciated that the payload structure identified for a given flow may be a best guess effort done by the codec detection module 78 based on various bit patterns and state buildup; as such, the payload structure associated with a given flow and stored in the table 84 may be heuristically based and in some instances may not be accurate, especially while an attempt is being made at building it up. This may serve to explain, in part, how a data stream may be considered a suspected bearer of encrypted video data without being 100% certain that this is the case. More specifically, identification of the given information stream as a data stream that is a suspected bearer of encrypted video data may be carried out in the absence of knowledge about whether the particular data stream carries encrypted video data, i.e., without first having determined with certainty whether the particular data stream does indeed carry encrypted video data.

It will be appreciated that certain embodiments or parts of the intermediate device 100 can be implemented as hardware, firmware, software, or a combination thereof. For example, the stream analysis unit 430 may be implemented as a microprocessor and the memory 440 may be implemented as a computer-readable program storage unit. An application program may be tangibly stored in the program storage unit, and may encode the various methods and functions referred to above. The application program in the program storage unit, as well as operating system code, may be read and executed by the microprocessor, thereby to carry out the various methods and functions encoded in the application program. The microprocessor may include one or more central processing units ("CPUs") and/or graphics processing units ("GPUs"). The interfaces 402, 450 allow the microprocessor to communicate with the ports 410, 420 as well as the device 499.

It should also be appreciated that while the above description has been focused on video codecs, those skilled in the art would find it within their purview to apply the teachings herein to any media that is coded and decoded, and is transported using packets, including but not limited to video and/or audio that is encoded/decoded by various video/audio codecs.

The examples and language recited herein are intended for pedagogical purposes to aid the reader in understanding the principles of the disclosed embodiments and concepts, and are to be construed as being without limitation to such specifically recited examples and language. Moreover, statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that certain adaptations and modifications of the described embodiments can be made. Therefore, the above discussed embodiments are to be considered illustrative and not restrictive. Also, it should be appreciated that additional elements that may be needed for operation of certain embodiments of the present disclosure have not been described or illustrated as they are assumed to be within the purview of the person of ordinary skill in the art. Moreover, any feature of any embodiment discussed herein may be combined with any feature of any other embodiment discussed herein in some examples of implementation. Moreover, certain embodiments of the present disclosure may be free of, may lack and/or may function without any element that is not specifically disclosed herein.

What is claimed is:

1. A method for execution by a network element, comprising:
processing a plurality of information streams transiting the network element to identify a particular data stream as a suspected bearer of encrypted media at least based on an inability to recognize data of the particular data stream, the particular data stream established between a first node and a second node;
extracting unencrypted data from the particular data stream that is the suspected bearer of encrypted media by:
establishing a first control stream with the first node and a second control stream with the second node, wherein the first control stream is established using credentials associated with the second node,
obtaining a cryptographic key sent by the first node over the first control stream and destined for the second node,
sending the cryptographic key to the second node over the second control stream,
obtaining encrypted media sent by the second node and destined for the first node, and
decrypting the obtained encrypted media based on the cryptographic key; and
accessing the decrypted media and transmitting the decrypted media onwards to at least another device;
wherein the encrypted media comprises encrypted video data, wherein the particular data stream comprises packets each comprising a header and a payload, and wherein the identifying comprises:
processing at least the header of each packet to determine a flow associated with the packet;
processing at least part of the payload of the packet to determine a candidate payload structure of the packet and processing at least part of the payload of the packet in accordance with the candidate payload structure, which includes processing at least part of the payload of the packet in accordance with one or more codec-specific tests;

concluding that the particular data stream is a suspected bearer of encrypted video data in case none of the one or more codec-specific tests is passed;

wherein the second control stream is established using credentials associated with the first node;

wherein one of the first node and the second node is a video management system (VMS) and wherein the other one of the first node and the second node comprises a security camera.

2. The method defined in claim 1, wherein processing the plurality of information streams transiting the network element to identify the particular data stream as a suspected bearer of encrypted media comprises passively accessing the plurality of information streams.

3. The method defined in claim 1, wherein processing the plurality of information streams transiting the network element to identify the particular data stream as a suspected bearer of encrypted media comprises intercepting and retransmitting the plurality of information streams.

4. The method defined in claim 1, further comprising storing the cryptographic key in memory.

5. The method defined in claim 1, wherein the encrypted media comprises encrypted video data.

6. The method defined in claim 5, wherein the identifying comprises (i) determining if data carried by the particular data stream is in accordance with one of a plurality of predetermined video codecs and (ii) concluding that the particular data stream is a suspected bearer of encrypted video data in case it is determined that the data carried by the particular data stream is not in accordance with any of the predetermined video codecs.

7. The method defined in claim 5, wherein the identifying comprises (i) applying a codec autodetection process to the payloads in an attempt to identify an associated video codec and (ii) concluding that the particular data stream is a suspected bearer of encrypted video data in case the codec autodetection process fails to identify a video codec associated with the payloads.

8. The method defined in claim 5, wherein the identifying comprises (i) processing the headers to obtain information regarding a format of the payload and (ii) concluding that the particular data stream is a suspected bearer of encrypted video data in case the format of the payload corresponds to an encrypted video format.

9. The method defined in claim 5, wherein the identifying comprises (i) processing the headers to obtain information regarding a source MAC address and (ii) concluding that the particular data stream is a suspected bearer of encrypted video data in case the source MAC address is in a predetermined set of MAC addresses associated with encrypted video data.

10. The method defined in claim 5, wherein the identifying is based on the headers of the packets being indicative of the presence of encrypted video data in the payloads of the packets of the particular data stream.

11. The method defined in claim 10, further comprising extracting the headers of the packets of the particular data stream and comparing the headers to values associated with at least one encrypted video format, so as to determine if the headers of the packets of the particular data stream are indicative of the presence of encrypted video data in the payloads of the packets of the particular data stream.

12. The method defined in claim 11, wherein the at least one encrypted video format comprises SRTP.

13. The method defined in claim 10, further comprising extracting camera identification data from the headers of the packets of the particular data stream and comparing the camera identification data to values known a prior to be associated with cameras that produce encrypted video data, so as to determine if the headers of the packets of the particular data stream are indicative of the presence of encrypted video data in the payloads of the packets of the particular data stream.

14. The method defined in claim 13, wherein the camera identification data comprises a source and/or destination MAC address.

15. The method defined in claim 14, wherein the camera identification data comprises a camera manufacturer and/or model.

16. The method defined in claim 1, wherein the identifying comprises determining a bandwidth of the particular data stream and concluding that the particular data stream is a suspected bearer of encrypted video data in case the bandwidth of the particular data stream exceeds a threshold.

17. The method defined in claim 1, wherein the particular data stream that is a suspected bearer of encrypted video data is connectionless and wherein the first and second control streams are connection-oriented.

18. The method defined in claim 1, wherein the credentials associated with the second node comprise a security certificate associated with the second node.

19. The method defined in claim 18, wherein the credentials associated with the second node are maintained by a certificate authority and wherein the method further comprises obtaining the credentials from an entity other than the certificate authority.

20. The method defined in claim 1, wherein the credentials associated with the first node comprise a username and password.

21. The method defined in claim 1, further comprising disrupting a pre-established control stream between the first node and the second node prior to establishment of the first control stream and the second control stream.

22. The method defined in claim 21, wherein disrupting the pre-established control stream comprises sending a reset command to the first node and/or to the second node.

23. The method defined in claim 21, wherein disrupting the pre-established control stream comprises blocking the particular data stream to cause a timeout in the particular data stream to be detected by the first node and/or the second node.

24. The method defined in claim 1, wherein the cryptographic key differs from a cryptographic key used to encrypt video data transmitted in the particular data stream.

25. The method defined in claim 1, wherein the encrypted video data sent by the second node and destined for the first node is transmitted along a second data stream established between the first node and the second node.

26. The method defined in claim 25, wherein the second data stream is established based on information exchanged by the first node and the second node over the first and second control streams.

27. The method defined in claim 25, wherein the second data stream is a re-established version of the particular data stream.

28. The method defined in claim 1, wherein the plurality of information streams includes at least one stream that does not carry encrypted media.

29. The method defined in claim 1, wherein the cryptographic key comprises a symmetric encryption key used by at least one of the nodes for encryption of video data and by at least the other of the nodes for decryption of the video data encrypted by using the encryption key.

30. The method defined in claim 1, wherein the cryptographic key comprises an encryption key used by the second node for obtaining the encrypted media from unencrypted media, and wherein decrypting the encrypted media based on the cryptographic key comprises: (i) obtaining a decryption key based on the encryption key; and (ii) applying the decryption key to the encrypted media to extract the unencrypted media.

31. The method defined in claim 30, wherein obtaining the decryption key based on the encryption key comprises using the encryption key as the decryption key.

32. The method defined in claim 30, wherein obtaining the decryption key based on the encryption key comprises querying a database based on the encryption key to obtain the decryption key.

33. The method defined in claim 1, wherein the media is video data and wherein identification of the particular data stream as a suspected bearer of encrypted video data is carried out without first having determining with certainty whether the particular data stream does carry encrypted video data.

34. A non-transitory computer-readable storage medium comprising computer-readable instructions which, when executed by a processor, cause the processor to carry out a method that includes:
    processing a plurality of information streams transiting the network element to identify a particular data stream as a suspected bearer of encrypted media at least based on an inability to recognize data of the particular data stream, the particular data stream established between a first node and a second node;
    extracting unencrypted data from the particular data stream that is the suspected bearer of encrypted media by:
        establishing a first control stream with the first node and a second control stream with the second node, wherein the first control stream is established using credentials associated with the second node,
        obtaining a cryptographic key sent by the first node over the first control stream and destined for the second node,
        sending the cryptographic key to the second node over the second control stream,
        obtaining encrypted media sent by the second node and destined for the first node, and
        decrypting the obtained encrypted media based on the cryptographic key; and
    accessing the decrypted media and transmitting the decrypted media onwards to at least another device;
    wherein the encrypted media comprises encrypted video data, wherein the particular data stream comprises packets each comprising a header and a payload, and wherein the identifying comprises:
        processing at least the header of each packet to determine a flow associated with the packet;
        processing at least part of the payload of the packet to determine a candidate payload structure of the packet and processing at least part of the payload of the packet in accordance with the candidate payload structure, which includes processing at least part of the payload of the packet in accordance with one or more codec-specific tests;
        concluding that the particular data stream is a suspected bearer of encrypted video data in case none of the one or more codec-specific tests is passed;
    wherein the second control stream is established using credentials associated with the first node;
    wherein one of the first node and the second node is a video management system (VMS) and wherein the other one of the first node and the second node comprises a security camera.

35. An apparatus, comprising:
    at least one first port for exchanging traffic with a first set of endpoints and at least one second port for exchanging traffic with a second set of endpoints, wherein the traffic comprises a plurality of information streams established between respective endpoints in the first set and respective endpoints in the second set;
    a stream analysis unit connected to the first and second ports, the stream analysis unit configured to:
    process the plurality of information streams to identify a particular data stream as a suspected bearer of encrypted media at least based on an inability to recognize data of the particular data stream, the particular data stream established between a first node in the first set of endpoints and a second node in the second set of endpoints;
    extract unencrypted data from the particular data stream that is the suspected bearer of encrypted media by:
        establishing a first control stream with the first node and a second control stream with the second node, wherein the first control stream is established using credentials associated with the second node,
        obtaining a cryptographic key sent by the first node over the first control stream and destined for the second node,
        sending the cryptographic key to the second node over the second control stream,
        obtaining encrypted media sent by the second node and destined for the first node, and
        decrypting the encrypted media based on the cryptographic key; and
    access the decrypted media and transmit the decrypted media onwards to at least another device;
    wherein the encrypted media comprises encrypted video data, wherein the particular data stream comprises packets each comprising a header and a payload, and wherein the identifying comprises:
        processing at least the header of each packet to determine a flow associated with the packet;
        processing at least part of the payload of the packet to determine a candidate payload structure of the packet and processing at least part of the payload of the packet in accordance with the candidate payload structure, which includes processing at least part of the payload of the packet in accordance with one or more codec-specific tests;
        concluding that the particular data stream is a suspected bearer of encrypted video data in case none of the one or more codec-specific tests is passed;
    wherein the second control stream is established using credentials associated with the first node;
    wherein one of the first node and the second node is a video management system (VMS) and wherein the other one of the first node and the second node comprises a security camera.

36. A method for execution by a network element located between a camera and a video management system (VMS), comprising:
    identifying a data stream established between the camera and the VMS, the data stream carrying encrypted video data;

causing the VMS to attempt to establish a control stream with the camera;

using credentials associated with the camera to intermediate an exchange of control information between the camera and the VMS, wherein the control information includes (i) control information for establishment of a second data stream between the VMS and the camera and (ii) a camera-bound cryptographic key sent by the VMS;

accessing over the second data stream VMS-bound encrypted video data sent by the camera; and decrypting the encrypted video data based on the cryptographic key.

37. A non-transitory computer-readable storage medium comprising computer-readable instructions which, when executed by a processor, cause the processor to carry out a method in accordance with claim 35.

38. An apparatus, comprising:

at least one first port for exchanging traffic with a first set of endpoints and at least one second port for exchanging traffic with a second set of endpoints, wherein the traffic comprises a plurality of information streams established between respective endpoints in the first set and respective endpoints in the second set;

a stream analysis unit connected to the first and second ports, the stream analysis unit configured to carry out the method defined in claim 33.

* * * * *